(12) United States Patent
Fujiwara et al.

(10) Patent No.: US 10,506,364 B2
(45) Date of Patent: Dec. 10, 2019

(54) POSITIONING DEVICE AND PROGRAM

(71) Applicant: TOSHIBA TEC KABUSHIKI KAISHA, Tokyo (JP)

(72) Inventors: Akihiko Fujiwara, Kawasaki Kanagawa (JP); Kenji Ito, Ota Tokyo (JP); Shigeo Uchida, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/909,932

(22) Filed: Mar. 1, 2018

(65) Prior Publication Data

US 2018/0279070 A1    Sep. 27, 2018

(30) Foreign Application Priority Data

Mar. 24, 2017 (JP) .................. 2017-059997
Dec. 11, 2017 (JP) .................. 2017-236794

(51) Int. Cl.
*H04W 4/02* (2018.01)
*G01S 5/02* (2010.01)
(Continued)

(52) U.S. Cl.
CPC ............... *H04W 4/02* (2013.01); *G01S 5/02* (2013.01); *G01S 5/021* (2013.01); *G01S 5/14* (2013.01); *G01S 11/06* (2013.01)

(58) Field of Classification Search
CPC ................... H04W 4/02; G01S 5/02
(Continued)

(56) References Cited

U.S. PATENT DOCUMENTS 9,820,092 B1    11/2017  Fujiwara et al.
2007/0217379 A1*  9/2007  Fujiwara ............... G01S 5/0205
                                                        370/338
(Continued)

FOREIGN PATENT DOCUMENTS

CN          102045836 A       5/2011

OTHER PUBLICATIONS

Extended European Search Report dated Jul. 26, 2018, filed in counterpart European Patent Application No. 18163667.1 (10 pages).

(Continued)

*Primary Examiner* — Chuck Huynh
(74) *Attorney, Agent, or Firm* — Kim & Stewart LLP

(57) ABSTRACT

A positioning server determines a location of a mobile device within an area including a plurality of base stations. The positioning server includes a communication circuit through which positioning data is received, a display device, an input unit, and a controller. The controller is configured to: (i) generate a user interface for display by the display device, the user interface including a user interface element through which a positioning mode of base stations can be defined, and an image of a map of an area in which the mobile device is to be located and icons representing the base stations that are within the area, (ii) store the positioning mode of the base stations in response to the inputs made through the input unit, and (iii) determine the location of the mobile device based on the positioning data and the stored positioning modes of the base stations.

20 Claims, 17 Drawing Sheets

333

| BEACON ID | MAP IMAGE | SETTING COORDINATE | CORRECTION VALUE | RECEIVING THRESHOLD | POSITION-ING SYSTEM | ADJACENCY ID |
|---|---|---|---|---|---|---|
| B00 | MAP1 | 220,400 | 0 | X | ONE POINT | |
| B01 | MAP1 | 215,370 | +5 | -70 | TWO POINT | |
| B02 | MAP1 | 230,300 | -5 | -70 | TWO POINT | |
| B03 | MAP1 | 270,450 | 0 | -70 | TWO POINT | |
| B04 | MAP1 | 290,360 | 0 | -70 | TWO POINT | |
| B05 | MAP1 | 300,280 | -10 | -70 | TWO POINT | |
| B06 | MAP1 | 300,280 | 0 | -70 | TWO POINT | |
| B07 | MAP2 | 20,30 | 0 | - | THREE POINT | |
| B08 | MAP2 | 50,60 | 0 | - | THREE POINT | |

(51) Int. Cl.
*G01S 5/14* (2006.01)
*G01S 11/06* (2006.01)

(58) Field of Classification Search
USPC .................................................... 455/456.1
See application file for complete search history.

(56) References Cited

U.S. PATENT DOCUMENTS

2011/0018732 A1* 1/2011 Cho .................. G01S 5/0236
340/8.1
2012/0307645 A1* 12/2012 Grosman .......... H04M 1/72577
370/241

OTHER PUBLICATIONS

U.S. Appl. No. 15/869,608, filed Jan. 12, 2018.
U.S. Appl. No. 15/467,122, filed Mar. 23, 2017.

* cited by examiner

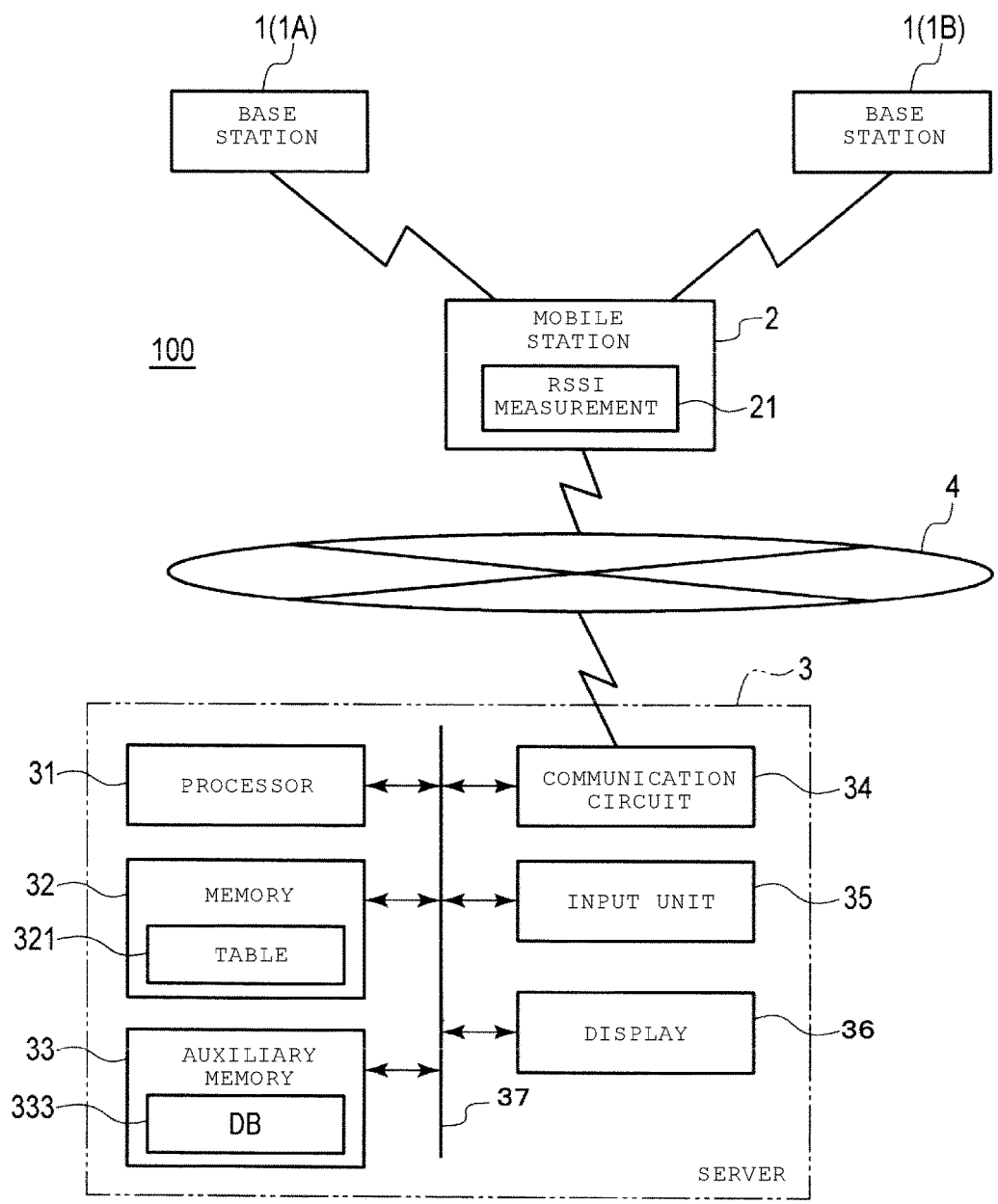

| BEACON ID | MAP IMAGE | SETTING COORDINATE | CORRECTION VALUE | RECEIVING THRESHOLD | POSITION-ING SYSTEM | ADJACENCY ID |
|---|---|---|---|---|---|---|
| B00 | MAP1 | 220,400 | 0 | X | ONE POINT | |
| B01 | MAP1 | 215,370 | +5 | -70 | TWO POINT | |
| B02 | MAP1 | 230,300 | -5 | -70 | TWO POINT | |
| B03 | MAP1 | 270,450 | 0 | -70 | TWO POINT | |
| B04 | MAP1 | 290,360 | 0 | -70 | TWO POINT | |
| B05 | MAP1 | 300,280 | -10 | -70 | TWO POINT | |
| B06 | MAP1 | 300,280 | 0 | -70 | TWO POINT | |
| B07 | MAP2 | 20,30 | 0 | - | THREE POINT | |
| B08 | MAP2 | 50,60 | 0 | - | THREE POINT | |

| BEACON ID | SETTING COORDINATE | POSITION-ING SYSTEM | OBJECT TO BE EDITED F | ICON S | ADJACENCY ID |
|---|---|---|---|---|---|
| B00 | 220,400 | ONE POINT | 0 | ○ | |
| B01 | 215,370 | TWO POINT | 1 | ▲ | |
| B02 | 230,300 | TWO POINT | 0 | ▽ | |
| B03 | 270,450 | TWO POINT | 0 | ▽ | |
| B04 | 290,360 | TWO POINT | 0 | ▽ | |
| B05 | 300,280 | TWO POINT | 0 | ▽ | |
| B06 | 300,280 | TWO POINT | 0 | ▽ | |

| BEACON ID | MAP IMAGE | SETTING COORDINATE | CORRECTION VALUE | RECEIVING THRESHOLD | POSITION-ING SYSTEM | ADJACENCY ID |
|---|---|---|---|---|---|---|
| B00 | MAP1 | 220,400 | 0 | X | ONE POINT | |
| B01 | MAP1 | 215,370 | +5 | −70 | TWO POINT | B02 |
| B02 | MAP1 | 230,300 | −5 | −70 | TWO POINT | B01 |
| B03 | MAP1 | 270,450 | 0 | −70 | TWO POINT | |
| B04 | MAP1 | 290,360 | 0 | −70 | TWO POINT | |
| B05 | MAP1 | 300,280 | −10 | −70 | TWO POINT | |
| B06 | MAP1 | 300,280 | 0 | −70 | TWO POINT | |
| B07 | MAP2 | 20,30 | 0 | − | THREE POINT | |
| B08 | MAP2 | 50,60 | 0 | − | THREE POINT | | and claims the benefit of
POSITIONING DEVICE AND PROGRAM

CROSS-REFERENCE TO RELATED APPLICATION

This application is based upon and claims the benefit of priority from Japanese Patent Application No. 2017-059997, filed Mar. 24, 2017, and Japanese Patent Application No. 2017-236794, filed Dec. 11, 2017; the entire contents of both applications are incorporated herein by reference.

FIELD

Embodiments described herein relate generally to a positioning device configured to measure a position of the positioning object by using a wireless communication technology and a program thereof.

BACKGROUND

In the related art, a positioning device configured to measure the position of a positioning object by using a wireless communication technology is known. The positioning device of this type is, for example, configured as follows. That is, a mobile station, which moves together with the positioning object, measures a radio receiving intensity, which is an intensity of received radio waves, emitted from a base station located at a predetermined position. The positioning device acquires measurement values of the radio receiving intensity, which is commonly known as and referred to hereinafter as an RSSI value, from the mobile station, and calculates the distance between the mobile station and the base station from the RSSI value, and specifies the position of the positioning object based on one or more pieces of distance information.

Generally, a method of specifying the position of the positioning object based on one piece of distance information is referred to as "one-point positioning system." A method of specifying the position of the positioning object based on two pieces of distance information is referred to as "two-point positioning system." A method of specifying the position of the positioning object based on three pieces of distance information is referred to as "three-point positioning system."

In the case of the two-point positioning system, the positioning device specifies the position on a segment of a straight line connecting the two base stations. Therefore, these two base stations need to be set to the positioning device as a pair so that the positioning device recognizes that these two base stations are located at both ends of the segment. Such setting is referred to as "adjacency setting." The adjacency setting is achieved by registering in each of the two base stations located at the both ends of the segment identification information of the other base station.

In the related art, an operator who performs the adjacency setting registers the identification information of the counterpart of the pair of the base stations manually. Therefore, the adjacency setting may be erroneously made between the base stations due to an erroneous input of the identification information. In addition, there may be a case where adjacency cannot be set correctly because registration of the identification information of one base station on the other base station is successfully performed but registration of the identification information of the other base station on the one base station is forgotten. In addition, if there are a number of sets of the base stations as objects for the two-point positioning system, the amount of work for manually inputting the identification information is significantly increased. Accordingly, simplification of the work required for the adjacency setting in a multiple-point positioning system including the two-point positioning system is desired.

DESCRIPTION OF THE DRAWINGS

FIG. 1 is a block diagram indicating a schematic configuration of a positioning system according to an exemplary embodiment;

FIG. 2 is a data table illustrating an example of a data record to be stored in a base station database;

FIG. 3 is a data table illustrating an area configuration of a map table;

FIG. 9 is a data table of the data record to be stored in the base station database;

DETAILED DESCRIPTION

Figure 4:
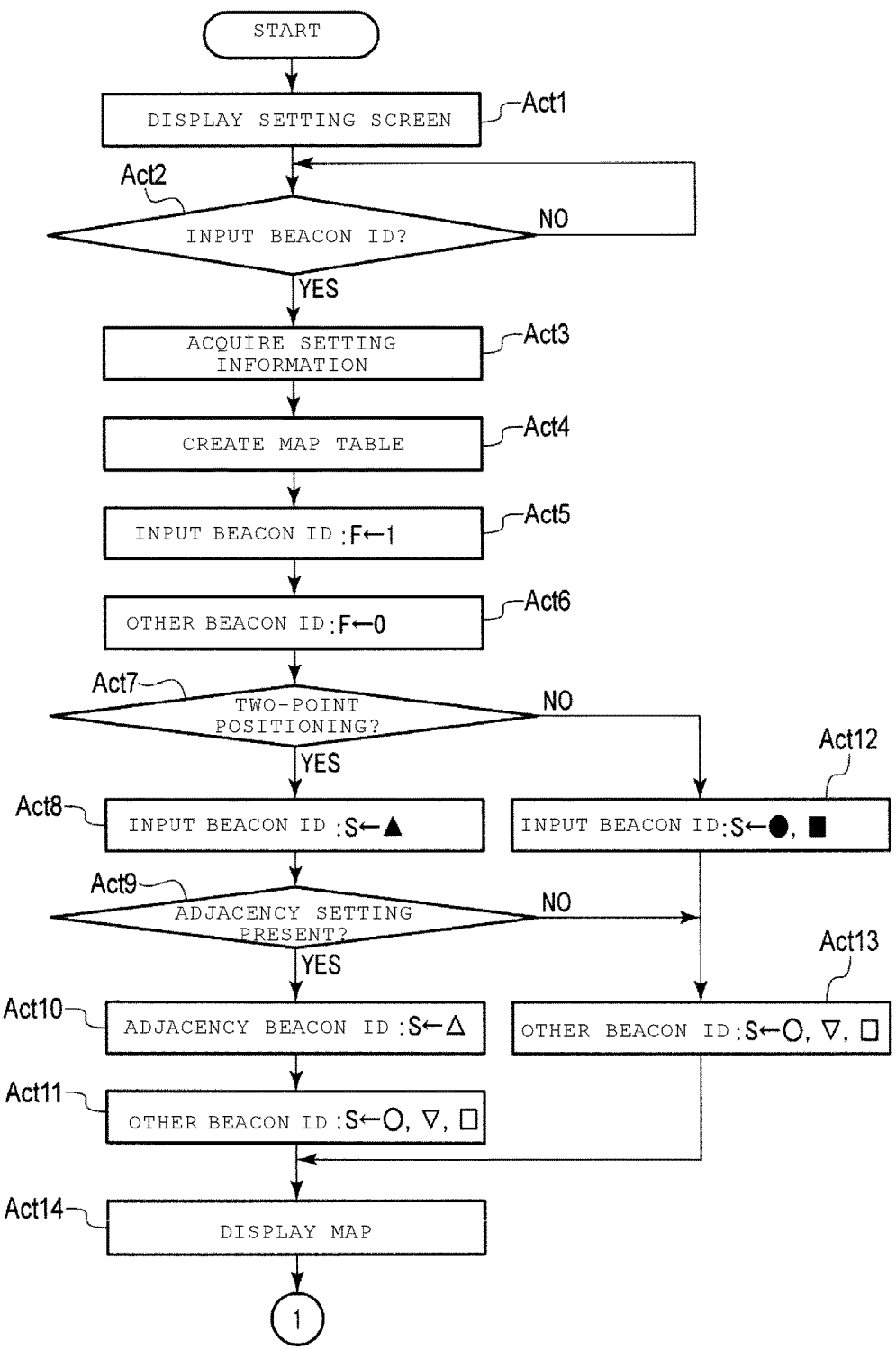
FIG. 4 is a flowchart illustrating a processing procedure to be executed by a processor of a server according to a program in a first embodiment.

Embodiments provide a positioning device and program which achieve simplification of the process for adjacency setting in a multiple-point positioning system.

In general, according to one embodiment, a positioning server determines a location of a mobile device within an area including a plurality of base stations. The positioning server includes a communication circuit through which the positioning server receives positioning data, a display device, an input unit, and a controller. The controller is configured to: (i) generate a user interface for display by the display device, the user interface including a user interface element through which a positioning mode of one or more of the base stations can be defined, and an image of a map of an area in which the mobile device is to be located and icons representing the base stations that are within the area, (ii) store the positioning mode of one or more of the base stations in response to the inputs made through the input unit, and (iii) determine the location of the mobile device based on the positioning data and the stored positioning modes of the base stations.

In these embodiments, a positioning system configured to measure positions of a moving body which moves on floors in factories, stores, and the like by using a wireless communication technology, will be explained as an example. In these embodiments, the floor corresponds to a positioning area. The positioning area may be one floor or may include a plurality of floors. The moving body is a positioning object. The moving body corresponds typically to a person, a vehicle, or an object to be transported by vehicles or equivalents.

First Embodiment

FIG. 1 is a schematic block diagram of a configuration of a positioning system 100. The positioning system 100 includes a plurality of base stations 1, a mobile station 2, a server 3, and a network 4.

The base stations 1 are installed to predetermined positions in a plurality of positioning areas. In FIG. 1, two base stations 1A and 1B are shown as an example of the plurality of base stations 1. The base stations 1 are fixed stations. The base stations 1 emit beacon signals periodically in accordance with a short-range wireless communication specification such as Bluetooth (Registered Trademark) or the like. That is, the base stations 1 correspond to beacon signal emitting stations. The beacon signal includes a specific beacon ID. The beacon ID may be a base station ID set uniquely to each base station 1 that emits a beacon signal including the beacon ID. In principle, the base stations 1 emit beacon signals at the substantially same transmission strength. The base stations 1 may be configured to change the transmission strength intentionally depending on the peripheral environment thereof.

The mobile station 2 is carried by the moving body which moves within the positioning area. The mobile station 2 receives beacon signals emitted from the base stations 1. In other words, the mobile station 2 corresponds to a beacon signal receiving station. The mobile station 2 includes a radio signal strength indicator (RSSI) measurement circuit 21. The mobile station 2 measures the radio receiving intensity of the beacon signals by the RSSI measurement circuit 21. The mobile station 2 includes a wireless communication unit (not illustrated) integrated therein. The mobile station 2 is connected to the network 4 via a wireless communication unit. The server 3 is connected to the network 4, and the mobile station 2 transmits data to the server 3 via the network 4. The mobile station 2 transmits values of the radio receiving intensities of the beacon signals measured by the RSSI measurement circuit 21, that is, RSSI values to the server 3 via the network 4 in association with the beacon IDs of the beacon signals corresponding to the RSSI values. Examples of the mobile station 2 described above typically include handheld information terminals such as smartphones, cellular phones, tablet terminals, and laptop computers. Examples of the communication network 4 include, for example, Wi-Fi (registered trademark) standard wireless networks and mobile communication networks.

The server 3 includes a processor 31, a memory 32, an auxiliary memory device 33, a communication circuit 34, an input unit 35, a display 36, and a system transmission path 37. The system transmission path 37 includes an address path, a data path, and a control signal line. The system transmission path 37 connects the processor 31 with the memory 32, the auxiliary memory device 33, the communication circuit 34, the input unit 35, and the display 36.

The processor 31 corresponds to a main portion of the server 3. The processor 31 controls respective parts of the server 3 so as to realize various functions as the server 3 according to an operating system or an application program.

The memory 32 corresponds to a main memory part of the server 3. The memory 32 includes a non-volatile memory area and a volatile memory area. The memory 32 stores an operating system and application programs in the non-volatile memory area. The memory 32 stores data required for the processor 31 for executing processing for controlling respective parts in a non-volatile or volatile memory area. In addition, the memory 32 uses the volatile memory area as a work area where the processor 31 rewrites data.

The auxiliary memory device 33 corresponds to an auxiliary memory part of the server 3. For example, EEPROM (Electric Erasable Programmable Read-Only Memory), HDD (Hard Disc Drive), SSD (Solid State Drive) and the like are used as the auxiliary memory device 33.

The input unit 35 and the display unit 36 serve as a user interface for governing information transmission with respect to the server 3. The input unit 35 includes at least one of a touch panel, a mouse, keys, and a keyboard, for example. The display unit 36 includes at least one of a liquid crystal display, and an LED display, for example.

The communication circuit 34 is connected to the network 4. The processor 31 of the server 3 performs data communication with the mobile station 2 via the communication circuit 34 and the network 4.

Upon reception of data of RSSI value (RSSI value+ beacon ID) from the mobile station 2 through the network 4, the server 3 calculates a distance r between the base station 1 and the mobile station 2 determined from the beacon ID and the mobile station 2 with the following formula (1) based on the received RSSI value. In the formula (1), A is an RSSI value of a radio signal measured at a location at 1 m apart from the corresponding base station 1, and B is a constant of a radio attenuation (logically 2).

$$\text{RSSI }(r)=A-10*B/\log 10\ (r) \tag{1}$$

The server 3 calculates the position of the mobile station 2 by using a single or a plurality of pieces of the distance information r. In other words, when using a single distance information r, the position of the mobile station 2 is calculated by the one-point positioning system. For example, the position of the mobile station 2 is calculated based on the base station 1 determined as a base station at a position closest to the mobile station 2. When using the plurality of pieces of the distance information r, the position of the mobile station 2 is calculated by the two-point positioning system or the three-point positioning system. In the case of the two-point positioning system, a point on the segment connecting the two base stations 1 at a ratio of the distance information r is specified as the position of the mobile station 2. In the case of the three-point positioning system, the position of the mobile station 2 is specified by a method of general trilateration. The server 3 here functions as a positioning device provided with a positioning unit that measures the position of the mobile station 2 based on the radio receiving intensity.

In the case of the two-point positioning system, for example, information indicating that base stations 1A an 1B are a pair of base stations of the two-point positioning system need to be set in the server 3 so that the server 3 recognizes that these two base stations 1A and 1B are located at both ends of the segment, respectively. Specifically, the identification information of the base station 1B is set in association with the identification information of the base station 1A, and the identification information of the base station 1A is associated with the identification information of the base station 1B. The identification information is, for example, the beacon ID of the beacon signals emitted from the base stations 1A and 1B.

Subsequently, setting of such an identification information, so-called adjacency setting, will be described.

The server 3 includes a base station database 333 in the auxiliary memory device 33 for saving the adjacency setting. In order to save the adjacency setting, the server 3 forms a map table 321 in the volatile area in the memory 32.

FIG. 2 is a data table illustrating an example of a data record to be saved in the base station database 333. The base station database 333 stores the setting information for each of the base stations 1 in one-to-one correspondence. The setting information includes items of at least "beacon ID", "map image", "setting coordinate", "correction value", "receiving threshold", "positioning system", and "adjacency ID."

The item "beacon ID" stores beacon IDs included in the beacon signals emitted from the base stations 1. The server 3 is capable of determining which base station 1, to which the data on the setting information stored in other item in the same record belong, from the beacon ID stored in the item "beacon ID." In other words, the item "map image", the item "setting coordinate", the term "correction value", the item "correction value", the item "receiving threshold", the item "positioning system", and the item "adjacency ID" store the setting information, and each pieces of the setting information in these items is associated with each of the corresponding beacon IDs stored in the item "beacon ID." Therefore, pieces of the information in the respective items belong respectively to the base stations 1 (hereinafter, referred to as "corresponding base station(s) 1") which are specified by the beacon IDs stored in the item "beacon ID."

Specifically, the item "map image" stores file names of data files in which map image data indicating the positioning areas where the corresponding base stations 1 are set is stored. In the auxiliary memory device 33, the data files storing the map image data for the respective floor as the positioning areas, are saved.

The item "setting coordinate" stores coordinate values which specify the positions where the corresponding base stations 1 are set in the positioning area. For example, when the positioning area is considered as a two-dimensional X-Y plane, the positions of the corresponding base stations on the X-Y plane are expressed by an X-coordinate value and a Y-coordinate value in pixels or meters. The coordinate values stored in the item "setting coordinate" correspond to the X-coordinate values and the Y-coordinate values.

The item "correction value" stores values for correcting the radio receiving intensity of beacon signals emitted from the corresponding base stations 1. As described above, in principle, the plurality of base stations 1 emit beacon signals at the substantially same intensity. However, the intensities of the beacon signals may have a certain difference from other base stations depending on quality fluctuations in manufacture or environment where the base stations 1 are installed. The values stored in the item "correction value" are values to correct the difference.

The item "receiving threshold" stores threshold values for the RSSI values of beacon signals emitted from the corresponding base stations 1. The RSSI value is increased when the distance between the emitting station (base stations 1) and the receiving station (mobile station 2) becomes smaller and is decreased when the distance becomes larger. Information on distances farther than necessary is not required for positioning of the moving body. The threshold value stored in the item "receiving threshold" corresponds to the maximum value of the RSSI value which derives the distance information which is not required for positioning of the moving body. The threshold value may be set each beacon ID, that is, for each individual base station 1, or may be set altogether in a unit of positioning area.

In the item "positioning system", text data indicating which positioning system for which the beacon signals emitted from the corresponding base stations 1 is used, is stored. For example, when the beacon signals emitted from the corresponding base stations 1 are used for positioning in the one-point positioning system, the text data "one point" is stored. When the beacon signals emitted from the corresponding base stations 1 are used for positioning in the two-point positioning system, the text data "two point" is stored. When the beacon signals emitted from the corresponding base stations 1 are used for positioning in the three-point positioning system, the text data "three point" is stored.

The item "adjacency ID" stores beacon IDs of the beacon signals emitted from the base stations 1 which are paired respectively with the corresponding base stations 1 when the beacon signals emitted from the corresponding base stations 1 are used for positioning in the two-point positioning system. For example, when specifying the position of the mobile station 2 on the segment between the two base stations 1A and 1B, the item "adjacency ID" of the data record for the mobile station 1A stores a beacon ID of a beacon signal emitted from the base station 1B as the identification information of the base station 1B. In contrast, the item "adjacency ID" of the data record for the corresponding base station 1B stores a beacon ID of a beacon signal emitted from the base station 1A as the identification information for the base station 1A.

FIG. 3 is a data table illustrating an area configuration of the map table 321. The map table 321 stores data record relating to the base stations 1 installed on one floor. The data record includes at least items of "beacon ID", "setting coordinate", "positioning system", "object to be edited F (hereinafter, referred to as "editing target F")", "icon S", and "adjacency ID." The data to be stored in the items "beacon ID", "setting coordinate", "positioning system", and "adjacency ID" are as described above.

The item "editing target F" stores flags which identifies whether the base station 1 specified by the corresponding beacon ID is an editing target or not in the adjacency setting operation described later. In the first embodiment, the flag is reset to "1" when the corresponding base station 1 is the editing target, and is reset to "0" when the corresponding base station 1 is not the editing target. Conversely, the flag may be set to "0" when the corresponding base station 1 is the editing target, and may be set to "1" when the corresponding base station 1 is not the editing target.

The item "icon S" stores icons for distinguishing between the attributes of the base stations 1 specified by the corresponding beacon IDs. The icons depicted in the first embodiment includes seven icons; an icon of a solid circle (hereinafter, referred to as icon "solid circle"), an icon of a hollow circle (hereinafter, referred to as icon "hollow circle", an icon of a solid triangle with an apex located on the top (hereinafter, referred to as icon "solid triangle"), an icon of hollow triangle with an apex located on the top (hereinafter, referred to as icon "hollow triangle"), an icon of a hollow inverted triangle (hereinafter, referred to as icon "inverted hollow triangle"), an icon of a solid square (hereinafter, referred to as icon "solid square"), and an icon of a hollow square (hereinafter, referred to as icon "hollow square"). The icon "solid circle" indicates a base station 1 to be edited used for positioning in the one-point positioning system. The icon "hollow circle" indicates a base station 1 not to be edited used for positioning in the one-point positioning system. The icon "solid triangle" indicates a base station 1 to be edited used for positioning in the two-point positioning system. The icon "hollow triangle" indicates a base station 1 used for positioning in the two-point positioning system and not to be edited, and set in adjacency with respect to the base station 1 to be edited. The icon "inverted hollow triangle" indicates a base station 1 not to be edited which emits a beacon signal to be used for positioning in the two-point positioning system, and indicates the base station 1 which is not set in adjacency with respect to the base station 1 to be edited. The icon "solid square" indicates a base station 1 not to be edited and emitting a beacon signal used for positioning in the three-point positioning system. The icon "hollow square" indicates a base station 1 not to be edited and emitting a beacon signal used for positioning in the three-point positioning system.

Figure 5:
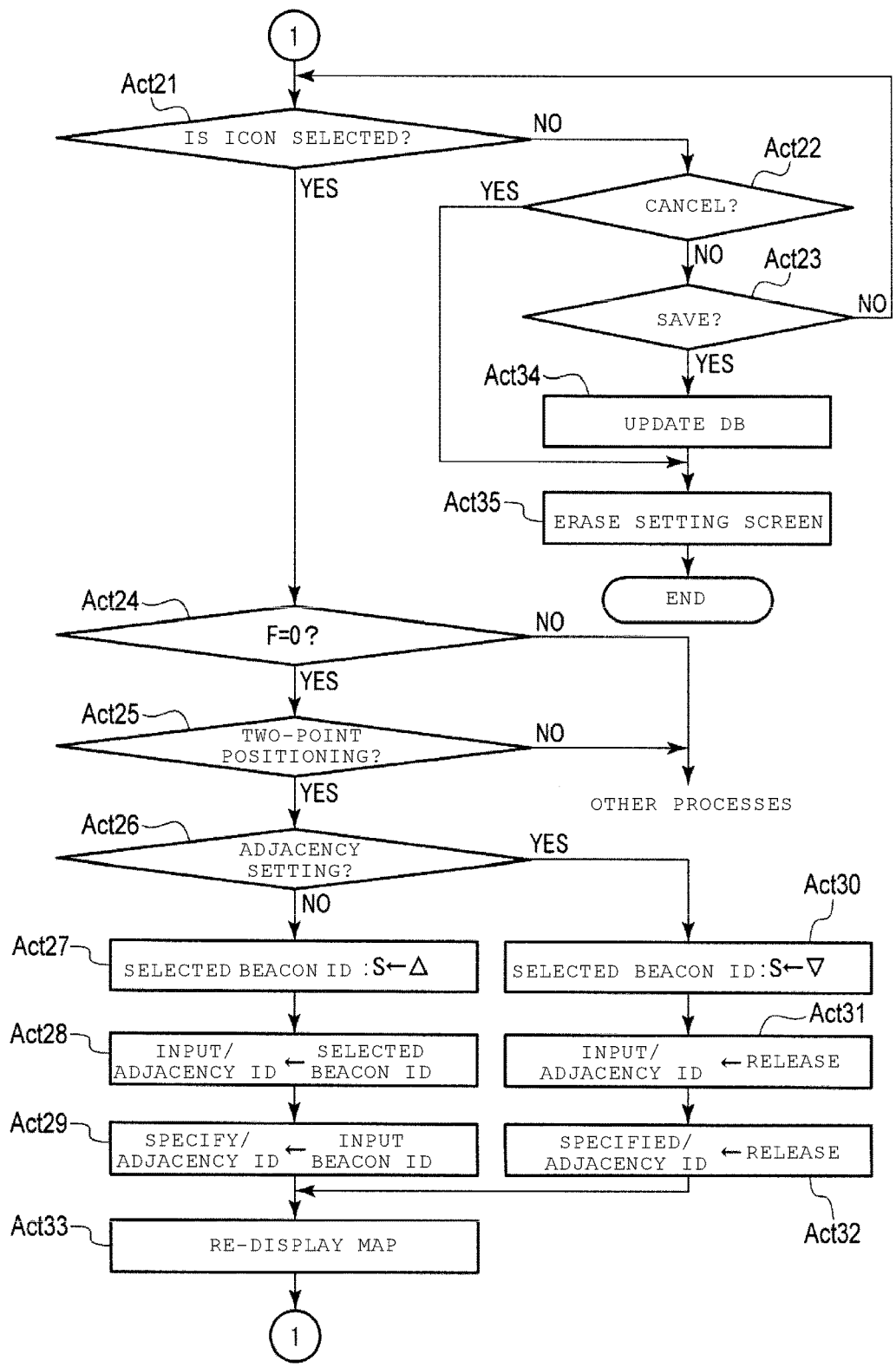
FIG. 5 is a flowchart illustrating the processing procedure to be executed by the processor of the server according to the program in the first embodiment.

FIG. 4 and FIG. 5 are flowcharts illustrating steps performed by the processor 31 according to a preset program, when the adjacency setting operation is selected from an operation menu of the server 3. The processes illustrated in FIG. 4 and FIG. 5 and described below are examples only. If the same results may be obtained, detailed operations and an order of the processing are not specifically limited to the example shown in FIGS. 4 and 5.

When the adjacency setting operation is started, the processor 31 first causes the display unit 36 to display a setting screen SC1 (see FIG. 6) (Act 1 in FIG. 4).

Figure 6:
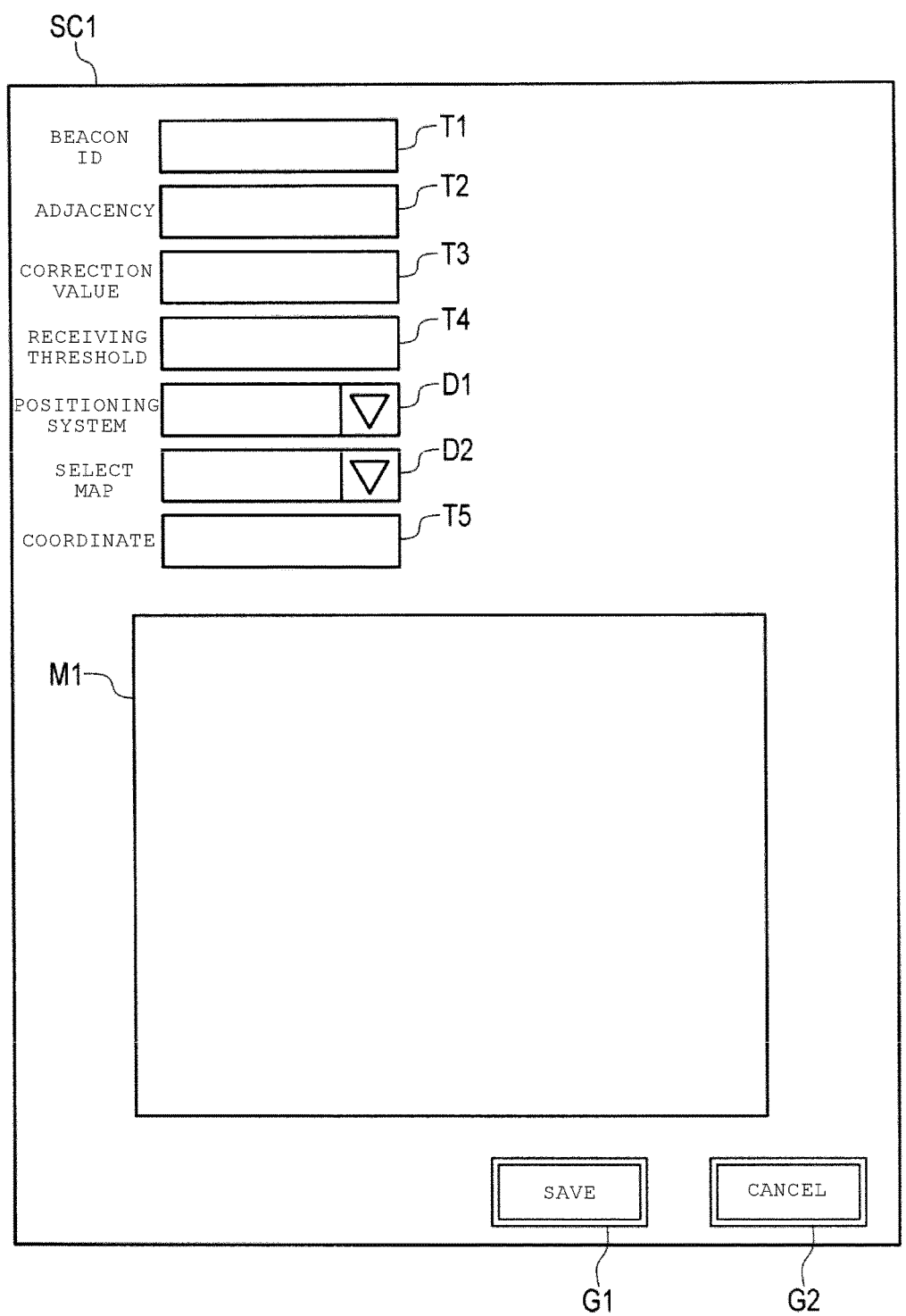
FIG. 6 is a schematic diagram of a setting screen according to a first embodiment.

FIG. 6 illustrates an example of the setting screen SC1 displayed on the display unit 36. As illustrated, the setting screen SC1 includes five text areas T1 to T5, two pull-down areas D1 and D2, one map area M1, a save button G1, and a cancel button G2.

The text area T1 is an area of the beacon ID for specifying the base station 1 to be edited for the adjacency setting as an editing target. The text area T2 is an area of the beacon ID for specifying the base station 1 which is set in adjacency with respect to the base station 1 to be edited, which is entered in the text area T1. The text area T3 is an area for the correction value set in the base station database 333 relating to the base station 1 to be edited. The text area T4 is an area for the receiving threshold set in the base station database 333 relating to the base station 1 to be edited. The text area T5 is the setting coordinate set in the base station database 333 relating to the base station 1 to be edited.

The pull-down area D1 is an area of a pull-down list including menu items (one-point positioning system, two-point positioning system, and three-point positioning system) in text data relating to the positioning system. The pull-down area D2 is an area of a pull-down list including menu items (MAP1, MAP2, . . . ) in text data indicating file names of the data fail name storing the map image data.

The map area M1 is an area for displaying a map image based on the map image data stored in the data file having the file name selected from the pull-down list in the pull-down area D2.

The save button G1 is a button for inputting an instruction from an operator to save the text data displayed in the text areas T1 to T5 in the base station database 333. The cancel button G2 is a button for inputting an instruction from the operator not to save the text data displayed in the text areas T1 to T5 in the base station database 333.

The operator confirms the setting screen SC1, then operates the input unit 35 to input a beacon ID which specifies the base station 1A from the two base stations 1A and 1B for adjacency setting in the text area T1.

The processor 31, which causes the display unit 36 to display the setting screen, waits for an input of the beacon ID in the text area T1 by the operator (FIG. 4, Act 2). When the beacon ID is input in the text area T1 (YES in Act 2), the processor 31 searches it in the base station database 333, and recognizes a file name of the item "map image" from the data record including the beacon ID entered in the text area T1. Subsequently, the processor 31 acquires all the data record in which the same file name is set in the item "map image" from the base station database 333, and stores the same in the memory 32. The processor 31 acquires the data file of the map image data in which the same file name is set from the auxiliary memory device 33 and stores the same in the memory 32 (FIG. 4, Act 3).

The processor 31 creates the map table 321 with data in the item "beacon ID", the item "setting coordinate", the item "positioning system", and the item "adjacency ID" in the data record acquired from the base station database 333 (FIG. 4, Act 4). The processor 31 sets a flag of the item "editing target F" corresponding to the beacon ID (hereinafter, referred to an "input beacon ID" input in the text area T1 to "1" in the map table 321 (FIG. 4, Act 5). The processor 31 resets the flags of the items "editing target F" corresponding to other beacon IDs to "0" (FIG. 4, Act 6).

Subsequently, the processor 31 confirms whether the data in the item "positioning system" corresponding to the input beacon ID is "two-point" or not in the map table 321 (FIG. 4, Act 7). In the case of the "two-point" (YES in Act 7), the processor 31 sets the icon "solid triangle" in the item "icon S" corresponding to the input beacon ID (FIG. 4, Act 8). The processor 31 confirms whether a beacon ID is set in the item "adjacency ID" corresponding to the input beacon ID (hereinafter, referred to as "adjacency beacon ID") (FIG. 4, Act 9). When the adjacency beacon ID is set (YES in Act 9), the processor 31 sets the icon "hollow triangle" in the item "icon S" of a data record in which the adjacency beacon ID is stored in the item "beacon ID" of the map table 321 (FIG. 4, Act 10). The processor 31 sets the icon "hollow circle", the icon "inverted hollow triangle", or the icon "hollow square" in the item "icon S" of a data record in which the beacon IDs other than the input beacon ID and the adjacency beacon ID are stored in the item "beacon ID" of the map table 321 (FIG. 4, Act 11). In other words, the processor 31 sets the icon "hollow circle" for a data record in which data in the item "positioning system" is "one-point", sets the icon "inverted hollow triangle" for a data record in which data in the item "positioning system" is "two-point", and sets the icon "hollow square" for a data record in which data in the item "positioning system" is "three-point."

In Act 9, when the adjacent beacon ID is not set (No in Act 9), the processor 31 sets the icon "hollow circle", the icon "inverted hollow triangle", or the icon "hollow square" in the item "icon S" of a data record in which the beacon IDs other than the input beacon ID are stored in the item "beacon ID" of the map table 321 (FIG. 4, Act 13). In other words, the processor 31 sets the icon "hollow circle" for a data record in which data in the item "positioning system" is "one-point", sets the icon "inverted hollow triangle" for a data record in which data in the item "positioning system"

is "two-point", and sets the icon "hollow square" for a data record in which data in the item "positioning system" is "three-point."

In contrast in Act 7, when data in the item "positioning system" corresponding to the input beacon ID is not "two-point" (No in Act 7), the processor 31 sets the icon "solid circle" or the icon "solid square" in the item "icon S" corresponding to the input beacon ID (FIG. 4, Act 12). In other words, the processor 31 sets the icon "solid circle" for a data record in a case where data in the item "positioning system" is "one-point", and sets the icon "solid square" for a data record in a case where data in the item "positioning system" is "three-point." Then the processor 31 goes to the process in Act 13. In other words, the processor 31 sets the icon "hollow circle" for a data record in a case where data in the item "positioning system" is "one-point", sets the icon "inverted hollow triangle" for a data record in a case where data in the item "positioning system" is "two-point", and sets the icon "hollow square" for a data record in a case where data in the item "positioning system" is "three-point."

When the process in Act 11 or Act 13 is completed, the processor 31 causes the display unit 36 to display a map image in the map area M1 from map image data in the data file acquired in Act 3 and data of the map table 321 (FIG. 4, Act 14). In other words, the processor 31 causes the display unit 36 to display the map image based on the map image data in the map area M1. In addition, the processor 31 causes the display unit 36 to display an icon set in the item "icon S" of the map table 321 according to coordinate values set in the item "setting coordinate" in the same data record so as to be superimposed on the map image.

Figure 7:
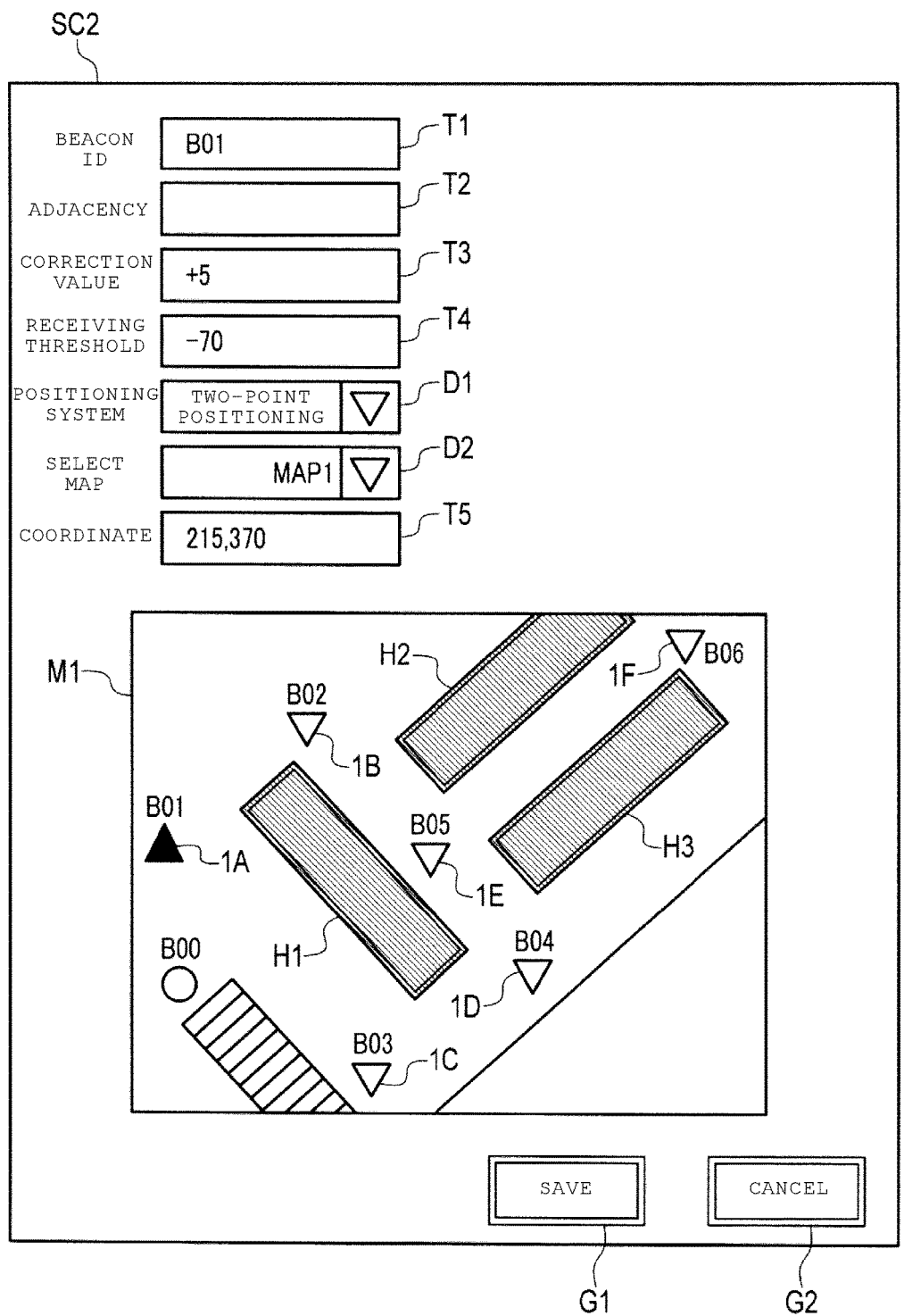
FIG. 7 is a schematic diagram of the setting screen according to the first embodiment.

FIG. 7 is an example of a setting screen SC2 in which a map image is displayed in the map area M1. This example illustrates a case where the data illustrated in FIG. 3 is set in the map table 321 by the operator by inputting a beacon ID "B01" of the base station 1A in the text area T1. The base station 1A is illustrated on the map image by the icon "solid triangle." Other base stations 1B, 1C, 1D, 1E, and 1F are illustrated on the map image by the icon "hollow circle", or the icon "inverted hollow triangle" respectively. Zones H1, H2, and H3 on the map image indicate areas of obstacles where the moving body cannot move.

From the respective icons on the map image, the operator can recognize the positions of the base stations 1A to 1F. Further, the operator can recognize the fact that the base station 1A to be edited (an adjacency setting object) corresponds to the two-point positioning system, and the fact that the other base station to be paired for the two-point positioning system is not yet set since no hollow triangle is indicated in the map image shown in the map area M1. In addition, the operator can recognize the fact that potential base stations which may be paired with the base station 1A in the two-point positioning system are the base station 1B having a beacon ID "B02" and the base station 1C having a beacon ID "B03" from the positions of the base stations 1B to 1F other than those to be edited and from the positions of the zones H1, H2, and H3 as obstacles.

When the base station 1B is selected for the adjacency setting operation, the operator operates the input unit 35 and selects the icon "inverted hollow triangle" for the base station 1B displayed in the map area M1. For example, when the input unit 35 is a touch panel, the operator can select the icon "inverted hollow triangle" of the base station 1B by touching it in the map area M1 displayed on the display unit 36. On the other hand, when the input unit 35 is a mouse, the operator places a pointer or a cursor on the icon "inverted hollow triangle" of the base station 1B and clicks.

The processor 31 which causes the display unit 36 to display the map image determines whether the icon is selected or not by the operator (FIG. 5, Act 21). When the icon is not selected (NO in Act 21), the processor 31 determines whether the cancel button G2 is selected or not by the operator (FIG. 5, Act 22). When the cancel button G2 is not selected (NO in Act 22), the processor 31 determines whether the save button G1 is selected or not by the operator (FIG. 5, Act 23). When the save button G1 is not selected (NO in Act 23), the processor 31 returns to Act 21. The processor 31 then waits until either the icon is selected by the processes of Act 21, Act 22, and Act 23 or the cancel button G2 or the save button G1 is selected by the process in Act 21, Act 22 and Act 23.

In this waiting state, when the fact that the icon is selected by the operator is detected (YES in Act 21), the processor 31 searches corresponding information in the map table 321, and acquires data in the items "editing target F", "positioning system", and "adjacency ID" of the data record in which the selected icon is set. Then, the processor 31 confirms whether a flag of the item "editing target F" is reset to "0" or not (FIG. 5, Act 24). When the fact that the flag is set to "0" is confirmed by the processor 31 (YES in Act 24), the processor 31 confirms whether the data in the item "positioning system" is "two-point" or not (FIG. 5, Act 25). When the fact that the data is "two-point" is confirmed by the processor 31 (YES in Act 25), then the processor 31 confirms whether the beacon ID " B01" is set in the item "adjacency setting" or not (FIG. 5, Act 26).

When the flag of the item "editing target F" is set to "1" (NO in Act 24), or when data of the item "positioning system" is not the "two-point" (NO in Act 25), the processor 31 executes other processes. Here, "other processes" means processes which are different from the processing after Act 26.

In Act 26, when the beacon ID "B01" of the base station 1A is not set in the item "adjacency setting" (NO in Act 26), the processor 31 sets the icon "hollow triangle" in the item "icon S" of the data record where the specified icon is set (FIG. 5, Act 27). In other words, the processor 31 changes the icon in the item "icon S" from the "inverted hollow triangle" to the "hollow triangle." The processor 31 also sets the beacon ID set in the item "beacon ID" of the data record in which the selected icon is set in the item "adjacency ID" of the data record in which the flag of the item "editing target F" is set to "1" (FIG. 5, Act 28). In addition, the processor 31 sets the beacon ID set in the item "beacon ID" of the data record in which the flag of the item "editing target F" is set to "1" in the item "adjacency ID" of the data record in which the selected icon is set (FIG. 5, Act 29).

In contrast, in Act 26, when the beacon ID "B01" of the base station 1A is set in the item "adjacency setting" (YES in Act 26), the processor 31 sets the icon "inverted hollow triangle" in the item "icon S" of the data record in which the selected icon is set (FIG. 5, Act 30). In other words, the processor 31 changes the icon in the item "icon S" from the "hollow triangle" to the "inverted hollow angle." The processor 31 deletes the beacon ID set in the item "beacon ID" of the data record in which the selected icon is set from the item "adjacency ID" of the data record in which the flag of the item "editing target F" is set to "1" (FIG. 5, Act 31). In addition, the processor 31 deletes the beacon ID set in the item "beacon ID" of the data record in which the flag of the item "editing target F" is set to "1" from the item "adjacency ID" of the data record in which the selected icon is set (FIG. 5, Act 32).

When the process in Act 29 or Act 32 is completed, the processor 31 updates the map image displayed in the map area M1 based on the data in the map table 321 (FIG. 5, Act 33). The processor 31 returns to a waiting state in Act 21 to Act 23.

Figure 8:
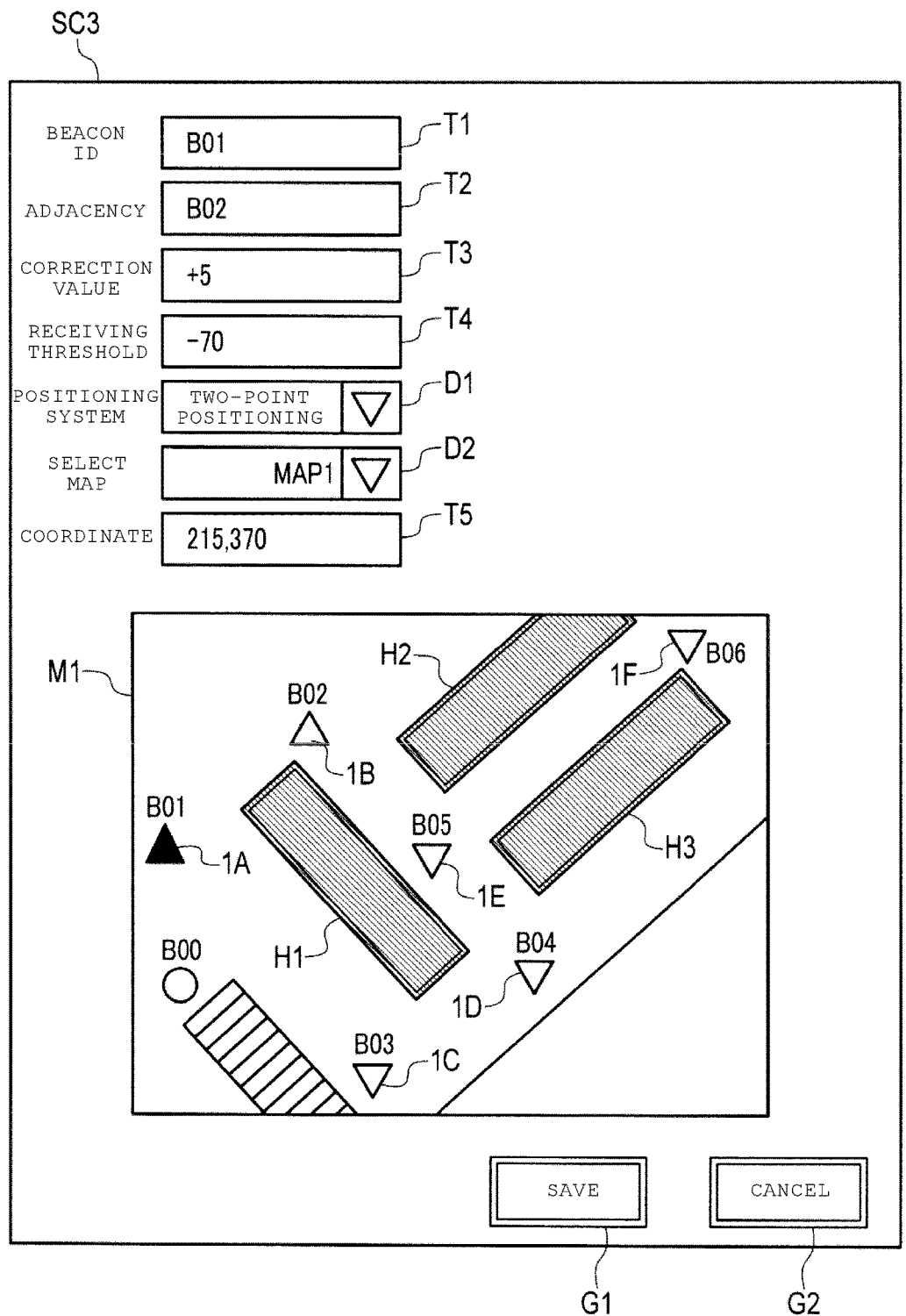
FIG. 8 is a schematic diagram of the setting screen according to the first embodiment.

FIG. 8 is an example of a setting screen SC3 updated by the operator by selecting the icon "inverted hollow triangle" of the base station 1B displayed in the map area M1 in FIG. 7. By selecting the icon "inverted hollow triangle" of the base station 1B, the processor 31 executes the process in Act 27 to Act 29. Consequently, the icon in the base station 1B is changed from the "inverted hollow triangle" to the "hollow triangle" as shown in FIG. 8. In the text area T2, the beacon ID "B02" of the base station 1B is displayed. The setting screen SC3 allows the operator to visually confirm the fact that the base station 1B is paired with the base station 1A to be edited (object for the adjacency setting) for the two-point positioning system.

In addition, when the base station 1C is selected for the adjacency setting, the operator may operate the input unit 35 and select the icon "inverted hollow triangle" for the base station 1C displayed in the map area M1. In this case as well, the processor 31 executes the process in Act 27 to Act 29. Consequently, the icon in the base station 1C is changed from the "inverted hollow triangle" to the "hollow triangle." In the text area T2, the beacon ID "B03" of the base station 1C is displayed together with the beacon ID "B02." The setting screen (not illustrated) allows the operator to know the fact that the base station 1B and the base station 1C are paired with the base station 1A to be edited (object for the adjacency setting) for the two-point positioning system.

In contrast, when the operator releases the adjacency setting of the base station 1C with respect to the base station 1A, the operator operates the input unit 35 and selects the icon "hollow triangle" of the base station 1C. In this case, the processor 31 executes the process in Act 30 to Act 32. Consequently, the icon in the base station 1C is returned back from the "hollow triangle" to the "inverted hollow triangle." The beacon ID "B03" is deleted from the text area T2. The setting screen (not illustrated) allows the operator to know the fact that the base station 1C is not paired with the base station 1A to be edited (object for the adjacency setting) for the two-point positioning system any longer.

In the waiting state from Act 21 to Act 23, when the processor 31 detects that the save button G1 is selected (YES in Act 23), the base station database 333 is updated by data of the map table 321 (FIG. 5, Act 34). In other words, the processor 31 updates the data record having the same beacon ID in the base station database 333 based on the data record in the map table 321 classified by the beacon ID (FIG. 5, Act 34). Subsequently, the processor 31 deletes the setting screen (FIG. 5, Act 35).

In the waiting state in Act 21 to Act 23, when the processor 31 detects that the cancel button G2 is selected (YES in Act 22), the processor 31 erases the setting screen without executing the process in Act 34 (FIG. 5, Act 35). With the procedure described above, the processor 31 completes the process to be performed when the adjacency setting operation is selected.

FIG. 9 illustrates a data table of the base station database 333 when the operator selects the save button G1 in a state in which the setting screen SC3 in FIG. 8 is displayed, that is, in a state in which adjacency of the base station 1A and the base station 1B is set. As illustrated, in the base station database 333, the beacon ID "B01" of the base station 1A, which is one of the pair of base stations 1A and 1B in the two-point positioning system, is set to the item "adjacency ID" of the data record in which the beacon ID "B02" of the base station 1B, which is the other one of the pair, is set. In the same manner, the beacon ID "B02" of the base station 1B is set to the item "adjacency ID" of the data record in which the beacon ID "B01" of the base station 1A is set. Consequently, the processor 31 is capable of recognizing the base station 1A and the base station 1B to be a pair in the two-point positioning system.

In this manner, according to the first embodiment, the operator is capable of visually determining that the base stations which allow for adjacency setting with the base station 1A by the setting screen SC2 illustrated in FIG. 7 are the base station 1B and the base station 1C. When the operator selects the icon "inverted hollow triangle" of the base station 1B, the setting screen is switched to the setting screen SC3 illustrated in FIG. 8. The setting screen SC3 allows the operator to visually confirm the fact that adjacency of the base station 1B with respect to the base station 1A is set. Subsequently, when the operator selects the save button G1, the base station database 333 is updated from the state illustrated in FIG. 2 to the state illustrated in FIG. 9. Therefore, the operator does not have to register the identification information of the other base station of the pair by manual input. In addition, a mistake such that adjacency cannot be set correctly because registration of the identification information of one base station on the other base station is successfully performed but registration of the identification information of the other base station on the one base station is forgotten does not happen. Consequently, the operation required for adjacent setting is simplified, and such a mistake that the adjacency setting is not performed correctly may be prevented. Such an effect is obvious when a number of sets of the base stations are present as objects for the two-point positioning system, and thus labor and time required for adjacency setting may be significantly simplified.

Second Embodiment

Figure 10:
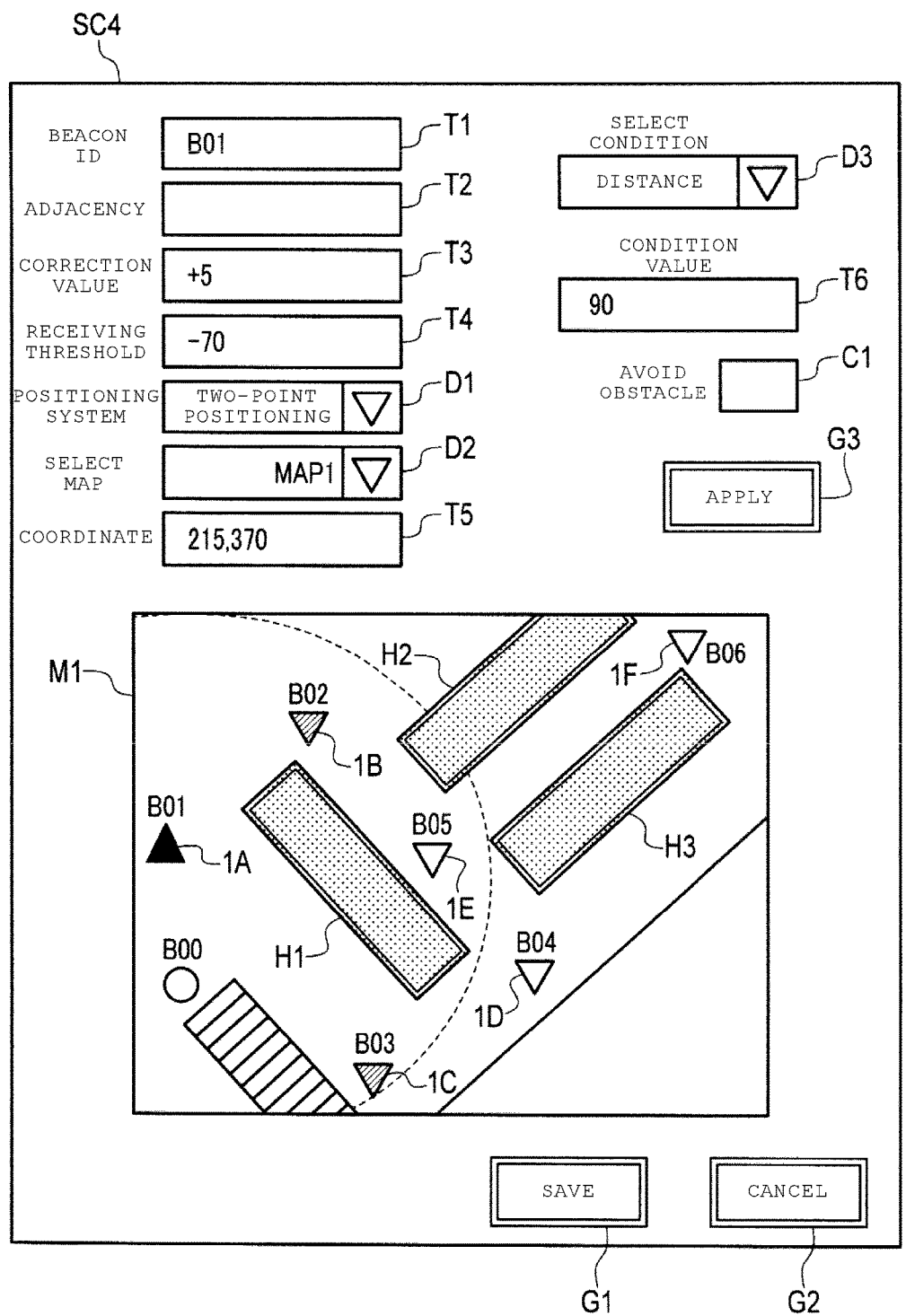
FIG. 10 is a flowchart illustrating an example of the setting screen according to a second embodiment.

FIG. 10 is an example of a setting screen SC4 according to a second embodiment. As illustrated in the drawing, in the setting screen SC4, a pull-down area D3, a text area T6, a checkbox area C1, and an apply button G3 are added when compared with the setting screens SC1 to SC3 of the first embodiment.

The pull-down area D3 is an area of a pull-down list including selectable conditions for narrowing potential base stations 1 for adjacency setting with respect to the base station 1 to be edited as menu items. The conditions for narrowing potential base stations 1 for adjacency setting can also be "distance" and "range." The condition based on "distance" specifies a distance which allows for adjacency setting with respect to the base station 1 to be edited so that adjacency of the base stations 1 included within a range in circle having a radius of the specified distance is enabled. The condition based on "range" specifies an arbitrary range which allows for adjacency setting so that adjacency setting of the base stations 1 included within the range is enabled. The specification of the range may be achieved with an existing technology. For example, the range may be specified by a dragging operation on the map image displayed in the map area M1 by a mouse. The conditions for narrowing potential base stations 1 for adjacency setting are not limited to the "distance" and the "range."

The text area T6 is an area of the condition values. When the condition is "distance", the distance (radius) from the base station 1 to be edited corresponds to the condition value. When the condition is "range", description in the text area T6 is invalid.

The checkbox area C1 is an area for specifying whether the base stations 1 having an intervening obstacle with respect to the base station 1 to be edited is excluded from objects to be narrowed down or not. In this embodiment, when the checkbox area C1 is checked, the base stations having an intervening obstacle are excluded from the objects to be narrowed down.

The apply button G3 is a button to be input when the operator instructs application of data input in the pull-down area D3, the text area T6, and the checkbox area C1.

Figure 11:
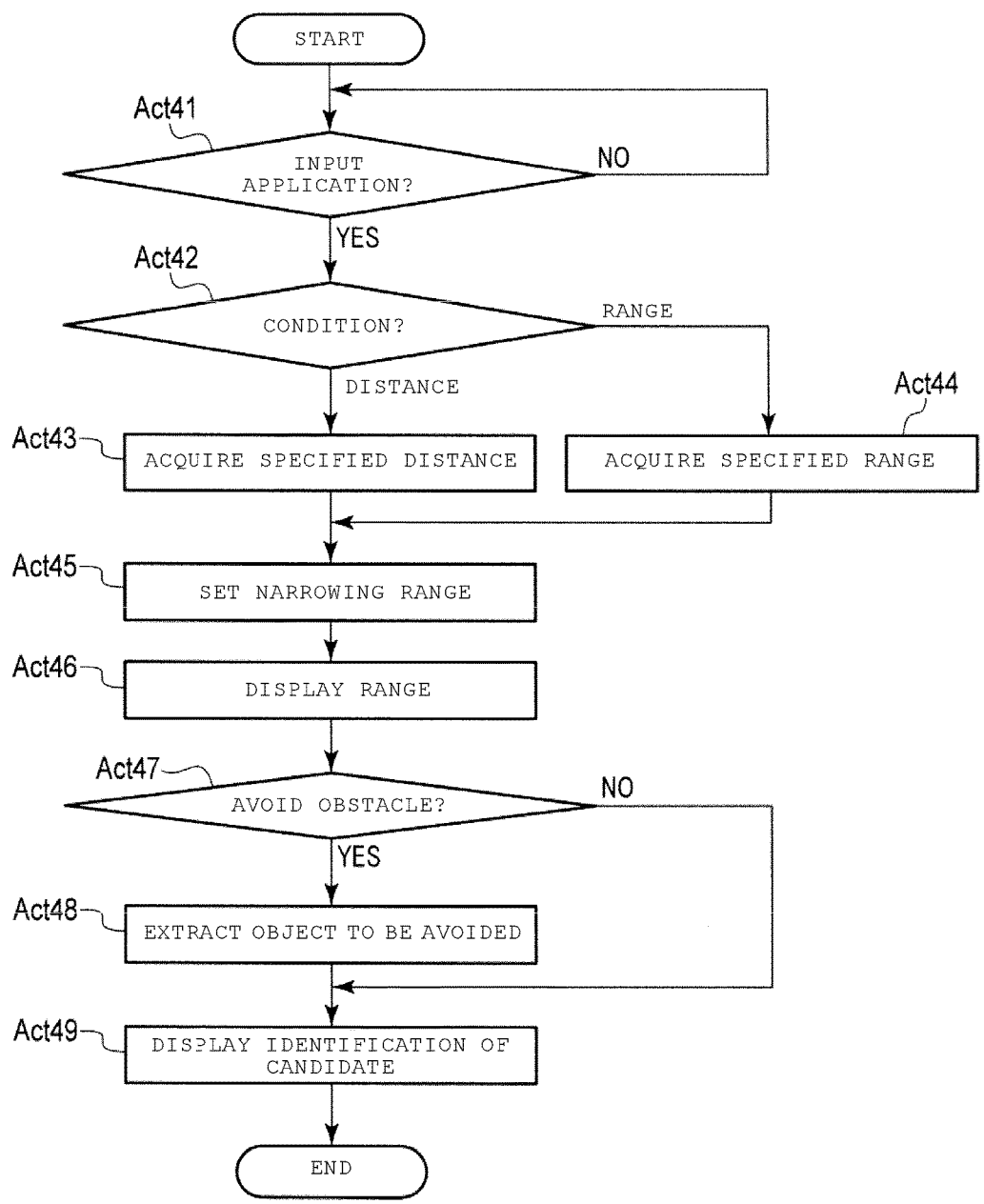
FIG. 11 is a flowchart illustrating a processing procedure to be executed by a processor of a sever according to a program in the second embodiment.

FIG. 11 is a flowchart illustrating steps carried out by the processor 31 according to a preset program after the apply button G3 of the setting screen SC4 is input. The steps illustrated in FIG. 11 are described as an example. If the same results may be achieved, the steps are not specifically limited to the ones illustrated herein.

In a state in which the setting screen SC4 is displayed, that is, in the waiting state in Act 21 to Act 23 in FIG. 5 described in the first embodiment, the processor 31 confirms whether the apply button G3 is input or not (Act 41). When the apply button G3 is input (YES in At 41), the processor 31 determines the conditions selected in the pull-down area D3 (Act 42).

When the condition is the "distance" ("Distance" in Act 42), the processor 31 acquires a condition value input in the text area T6 (Act 43). When the condition is the "range" ("Range" in Act 42), the processor 31 acquires a range specified on the map image (Act 44).

After the process in Act 43 or Act 44, the processor 31 sets the narrowing range (Act 45). In other words, when the condition is the "distance", the processor 31 specifies a precise circle having a radius of the condition value from the base station 1A to be edited as a narrowing range. When the condition is the "range", the processor 31 specifies a range acquired by the process in Act 44 as a narrowed range.

When the processor 31 causes the display unit 36 to display a narrowing range in the map area M1 (Act 46). For example, as illustrated in FIG. 10, the processor 31 causes the display unit 36 to display a narrowed range in the map area M1 by a broken line. Alternatively, the processor 31 causes the display unit 36 to display the narrowed range by differentiating the color between in and out of the narrowed range.

The processor 31 determines whether an instruction for avoiding obstacles is issued or not (Act 47). When the checkbox area C1 is checked, that is, when the instruction for avoiding obstacles is issued (YES in Act 47), the processor 31 extracts the base stations having intervening obstacles on a segment connecting to the base station 1A to be edited as objects to be excluded out of base stations existing within the narrowed range (Act 48). When the checkbox area C1 is not checked, that is, when the instruction for avoiding obstacles is not issued (NO in Act 47), the processor 31 does not execute the process in Act 48. The processor 31 distinguishably causes the display unit 36 to display icons of base stations not extracted as objects to be excluded and set to "two-point" as data of the item "positioning system" out of the base stations within the narrowed range as icons candidate for adjacency (Act 49). Subsequently, the processor 31 returns back to the waiting state in Act 21 to Act 23.

The setting screen SC4 in FIG. 10 illustrates a map image in the map area M1 when the condition is the "distance" and the instruction for avoiding obstacles is issued. From the setting screen SC4, the operator may easily recognize the fact that the base station 1B and the base station 1C are potential base stations for adjacency setting with respect to the base station 1A to be edited. The base station 1E may easily be recognized as being excluded from the object for adjacency setting due to an obstacle on the segment that connects to the base station 1A with a straight line although being within the narrowed range. Consequently, the operator needs only to specify at least one of the base station 1B and the base station 1C and perform adjacency setting.

In this manner according to the second embodiment, by specifying the condition for narrowing the potential base stations 1 for adjacency setting, the base stations which do not match the condition may be excluded from the object for adjacency setting. Consequently, the base stations as the object for adjacency setting may be narrowed down. In addition, the base stations which are determined as objects for adjacency setting are displayed differently from other base stations, and thus is differentiated visually as well. Therefore, adjacency setting is achieved more efficiently than in the first embodiment.

Third Embodiment

Figure 12:
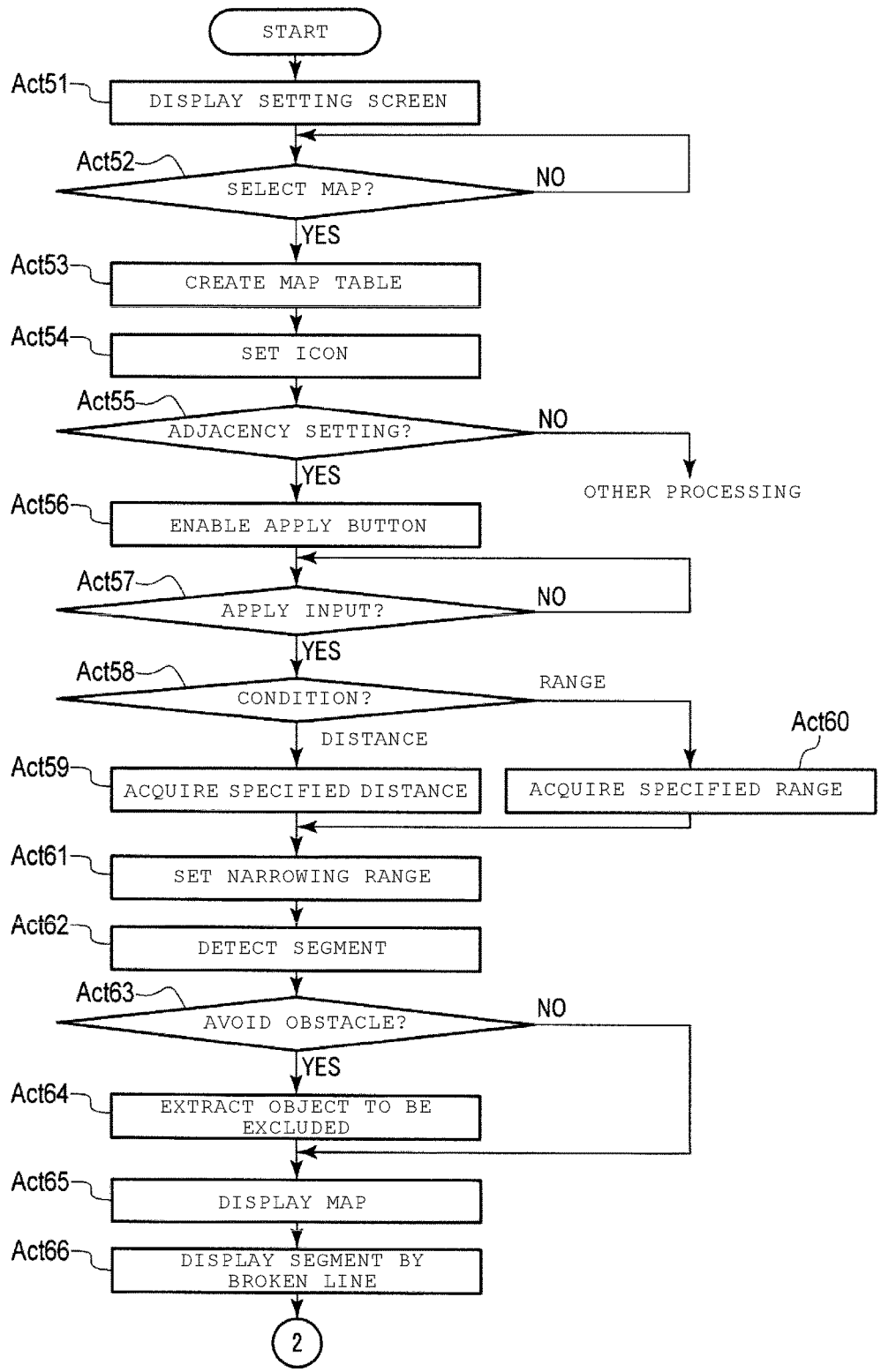
FIG. 12 is a flowchart illustrating a processing procedure to be executed by a processor of a server according to a program in a third embodiment.
Figure 13:
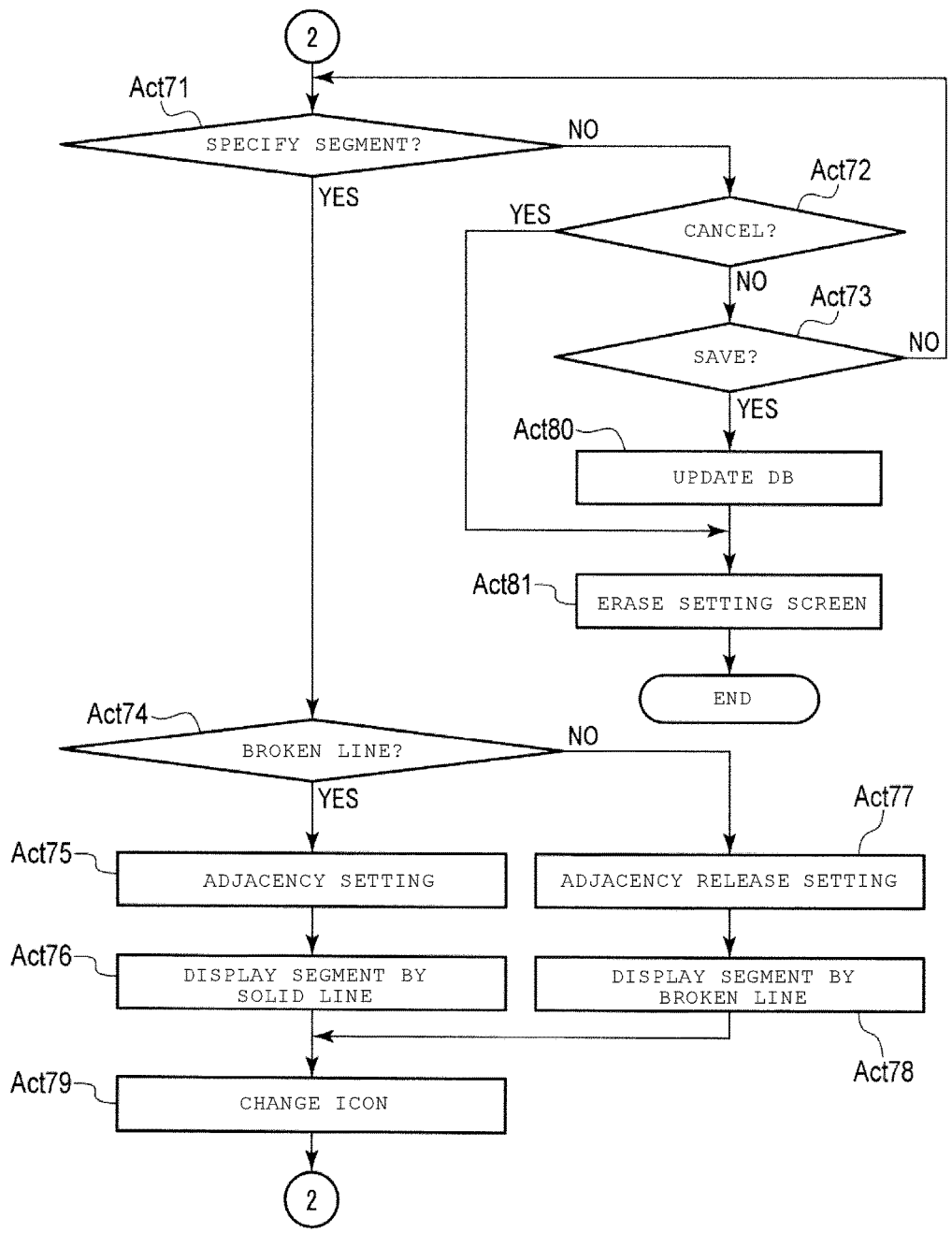
FIG. 13 is a flowchart illustrating a processing procedure to be executed by the processor of the server according to the program in the third embodiment.

FIG. 12 and FIG. 13 are flowcharts illustrating steps carried out by the processor 31 according to a preset program when the adjacency setting operation is selected from operation menu of the server 3 according to a third embodiment. The steps illustrated in FIG. 12 and FIG. 13 and described below are examples only. If the same results may be achieved, the steps are not specifically limited to the ones illustrated herein.

When the adjacency setting operation is started, the processor 31 first causes the display unit 36 to display a setting screen SC5 (see FIG. 14) (FIG. 12, Act 51).

Figure 14:
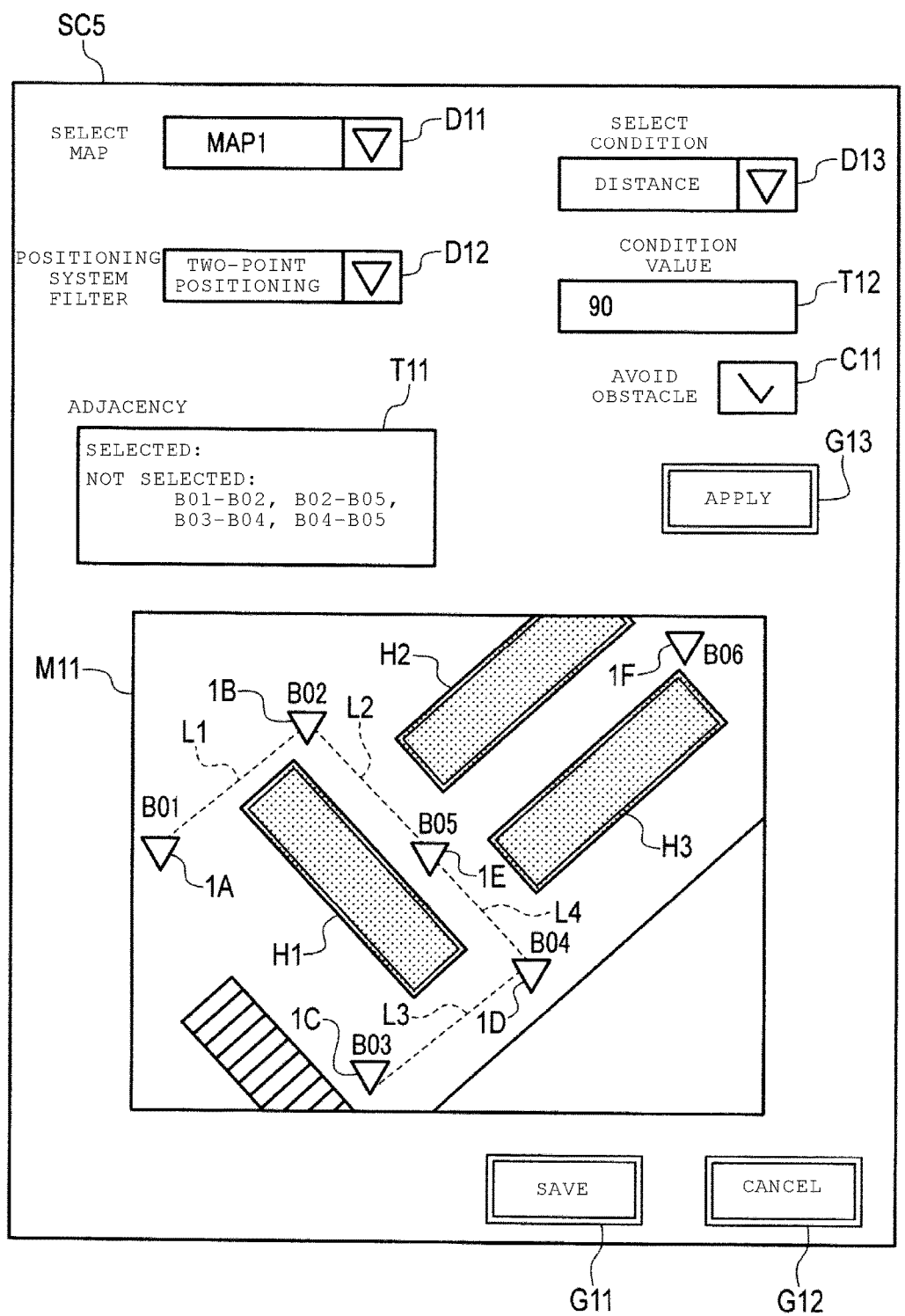
FIG. 14 is a flowchart illustrating an example of a setting screen according to the third embodiment.

FIG. 14 illustrates an example of the setting screen SC5. As illustrated, the setting screen SC5 includes three pull down areas D11 to D13, two text areas T11 and T12, a checkbox area C11, one map area M11, a store button G11, a cancel button G12, and an apply button G13.

The pull-down area D11, the pull-down area D12, and the pull-down area D13 have the same functions as the pull-down area D2, the pull-down area D1, and the pull-down area D3 in the setting screens SC1 to SC4 described respectively in the first and second embodiments. The text area T12 and the checkbox area C11 have the same functions as the text area T6 and the checkbox area C1 in the setting screen SC4 described in the second embodiment. The map area M11, the store button G11, the cancel button G12, and the apply button G13 have the same functions as the map area M1, the save button G1, the cancel button G2, and the apply button G3 described in the first and second embodiments.

The text area T11 is an area in which sets of two base stations as objects for adjacency setting are expressed in an expression form in which respective beacon IDs are coupled. The text area T11 displays sets selected for adjacency setting and sets not selected differently.

In Act 51, the text areas T11 and T12 are empty. In the map area M11, no map image is displayed. The apply button G13 is disabled.

After confirmation of the setting screen SC5, the operator who performs adjacency setting operates the pull-down area D11, and performs adjacency setting selects a map of a floor where adjacency setting is to be performed. The operator operates the pull-down area D12 to select a positioning system. A pull-down list in the pull-down area D12 has a menu for selecting "one-point positioning", "two-point positioning", "three-point positioning", and "all", and thus the operator selects either the "two-point positioning" or "all." The operator then selects a narrowing condition from the pull-down area D13. The operator performs an input of a condition value to the text area T11 or inputs a check into the checkbox area C11. Subsequently, the operator selects the apply button G13.

The processor 31 which causes the display unit 36 to display the setting screen SC5 waits for selection of a file name of data file in which map image data is stored in the pull-down area D11 (FIG. 12, Act 52). When the file name is selected (YES in Act 52), the processor 31 creates the map table 321 (FIG. 12, Act 53). In other words, the processor 31 acquires all the data record in which the selected file name is set in the item "map image" from the base station database 333, and stores the same in the memory 32. The processor 31 acquires the data file of the map image data in which the same file name is set from the auxiliary memory device 33, and stores the same in the memory 32. The processor 31 then creates the map table 321 with data in the item "beacon ID", the item "setting coordinate", the item "positioning system", and the item "adjacency ID" in the data record acquired from the base station database 333.

Subsequently, the processor 31 sets the icon "hollow circle", the icon "inverted hollow triangle", or the icon "hollow square" in the item "icon S" of the map table 321 (FIG. 5, Act 54). In other words, the processor 31 sets the icon "hollow circle" for a data record in which data in the item "positioning system" is "one-point", sets the icon "inverted hollow triangle" for a data record in which data in the item "positioning system" is "two-point", and sets the icon "hollow square" for a data record in which data in the item "positioning system" is "three-point."

Subsequently, the processor 31 confirms whether a menu item for adjacency setting is selected in the pull-down area D12 or not (FIG. 12, Act 55). The menu item for adjacency setting includes "all" or "two-point positioning." When other menu items are selected (NO in Act 55), the processor 31 executes other processes. Here, "other processes" after NO in Act 55 is different from the processing of "other processes" after NO in Act 24 or Act 25.

The "all" or the two-point positioning is selected (YES in Act 55), the processor 31 enables an input of the apply button G13 (FIG. 12, Act 56). The processor 31 then wait for an input of the apply button G13 (FIG. 12, Act 57). When the processor 31 recognizes that the apply button G13 is input (YES in Act 57), the processor 31 determines the conditions selected in the pull-down area D3 (FIG. 12, Act 58).

When the condition is the "distance" ("Distance" in Act 58), the processor 31 acquires a condition value input in the text area T12 (FIG. 12, Act 59). When the condition is the "range" ("Range" in Act 58), the processor 31 acquires a range specified on the map image (Act 60).

After the process in Act 59 or Act 60, the processor 31 sets the narrowing range (FIG. 12, Act 61). In other words, when the condition is the "distance", the processor 31 specifies the distance between the base stations being not higher than the condition value as the narrowing range. When the condition is the "range", the processor 31 specifies a range acquired by the process in Act 60 as a narrowed range. Then, the processor 31 detects a segment connecting two base stations existing in the narrowed range with a straight line (FIG. 12, Act 62).

The processor 31 determines whether an instruction for avoiding obstacles is issued or not (FIG. 12 Act 63). When the checkbox area C1 is checked, that is, when the instruction for avoiding obstacles is issued (YES in Act 63), the processor 31 extracts the segment connecting two base stations and having intervening obstacles as objects to be excluded (FIG. 12, Act 64). When the checkbox area C1 is not checked, that is, when the instruction for avoiding obstacles is not issued (NO in Act 63), the processor 31 does not execute the process in Act 64.

The processor 31 causes the display unit 36 to display a map image in the map area M1 from map image data in the data file acquired in Act 53 and the data of the map table 321 (FIG. 12, Act 65). In addition, the processor 31 causes the display unit 36 to display a segment connecting two base stations existing in the narrowed range except for the segments extracted as the objects to be excluded with a straight line by a broken line (FIG. 12, Act 66).

The setting screen SC5 in FIG. 14 illustrates a map image displayed in the map area M1 when the condition is the "distance", the condition value is 90 cm, and the instruction for avoiding obstacles is selected. Under such a condition, segments L1, L2, L3 and L4 between the base stations are not longer than 90 cm and not blocked by the obstacles are displayed by broken lines.

The operator, upon confirmation of such a map image, specifies the segment L1 when setting adjacency between the base station 1A and the base station 1B. For example, when the input unit 35 is a touch panel, the operator touches the segment L1. For example, if the input unit 35 is a mouse, the operator places a pointer or a cursor on the segment L1 and clicks.

The processor 31 which causes the display unit 36 to display the segment determines whether any one of the segments is selected or not (FIG. 13, Act 71). When the segment is not selected (NO in Act 71), the processor 31 determines whether the cancel button G12 is selected or not (FIG. 13, Act 72). When the cancel button G12 is not selected (NO in Act 72), the processor 31 determines whether the save button G11 is selected or not (FIG. 13, Act 73). When the save button G11 is not selected (NO in Act 73), the processor 31 returns to Act 71. The processor 31 then waits until either the segment is selected by the processes of Act 71, Act 72, and Act 23 or the cancel button G12 or the save button G11 is selected.

In the waiting state, when the processor 31 detects that a segment is selected (YES in Act 71), the processor 31 confirms whether the selected segment is displayed by a broken line or by a solid line (FIG. 13, Act 74). In the case of the broken line display (YES in Act 74), the processor 31 performs adjacency setting with respect to the pair of the base stations 1A and 1B setting at both ends of the segment L1 (Act 75). In other words, the processor 31 changes the icon of the item "icon S" of the data record of the map table 321 including the beacon ID "B01" of the base station 1A from the "inverted hollow triangle" to the "hollow triangle." The processor 31 sets the beacon ID "B02" of the other base station 1B in the item "adjacency ID" of the same data record. In the same manner, the processor 31 changes the icon of the item "icon S" of the data record of the map table 321 including the beacon ID "B02" of the other base station 1B from the "inverted hollow triangle" to the "hollow triangle." The processor 31 sets the beacon ID "B01" of the other base station 1A in the item "adjacency ID" of the same data record. Subsequently, the processor 31 causes the display unit 36 to display the segment L1 by a solid line (Act 76).

In contrast, when the selected segment is displayed by a solid line (NO in Act 74), the processor 31 performs adjacency release setting with respect to the pair of the base stations 1A and 1B located at both ends of the segment L1 (Act 77). In other words, the processor 31 returns the icon of the item "icon S" of the data record of the map table 321 including the beacon ID "B01" of the base station 1A from the "hollow triangle" to the "inverted hollow triangle." The processor 31 deletes the beacon ID "B02" of the base station 1B in the item "adjacency ID" of the same data record. In the same manner, the processor 31 returns the icon of the item "icon S" of the data record of the map table 321 including the beacon ID "B02" of the base station 1B from the "hollow triangle" to the "inverted hollow triangle." The processor 31 deletes the beacon ID "B01" of the base station 1A from the item "adjacency ID" of the same data record. Subsequently, the processor 31 causes the display unit 36 to display the segment L1 by a broken line (Act 78).

When the process in Act 76 or Act 78 is completed, the processor 31 causes the display unit 36 to display the icon changed by adjacency setting or adjacency release setting on the map image (Act 79).

Figure 15:
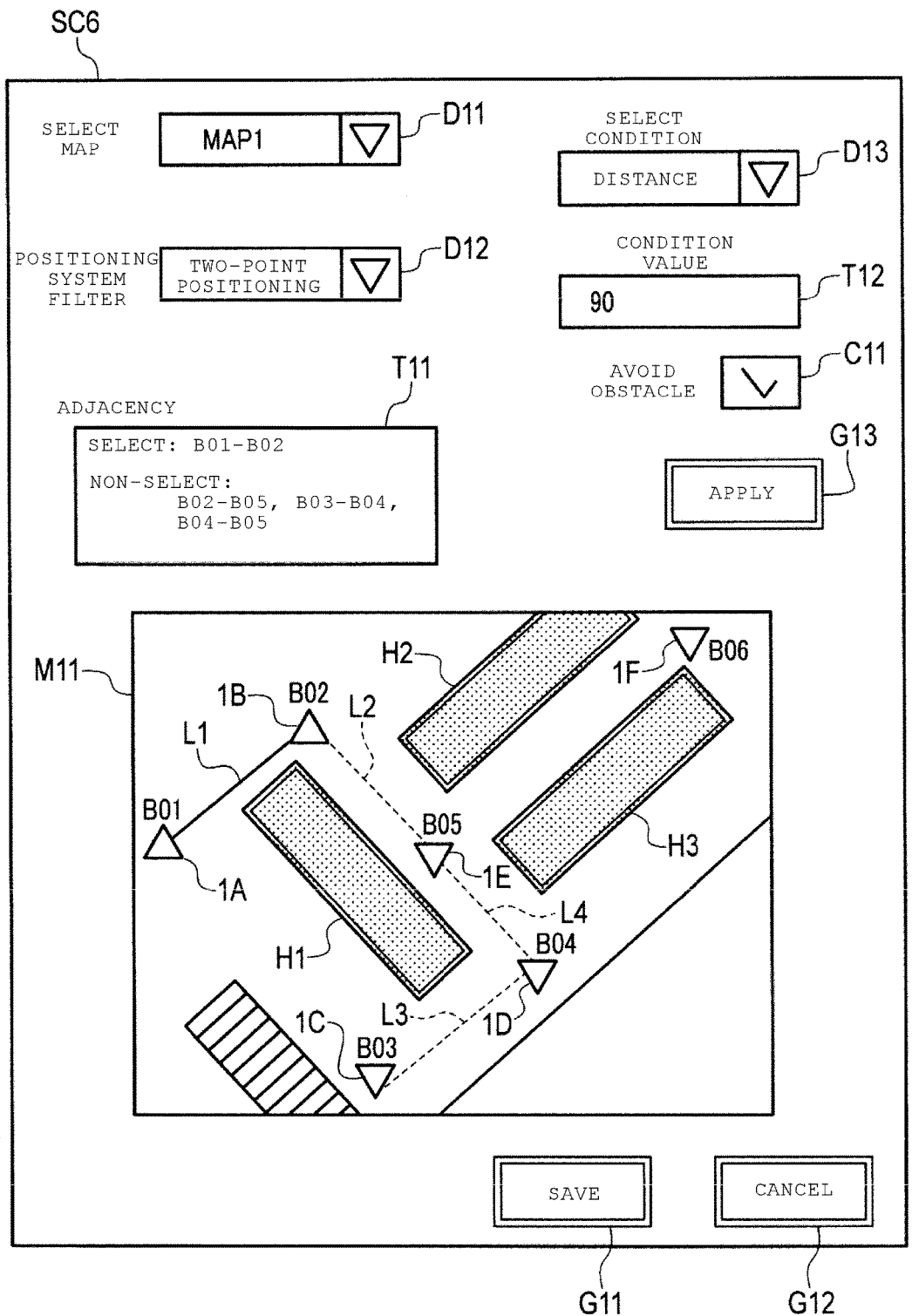
FIG. 15 is a flowchart illustrating an example of the setting screen according to the third embodiment.

FIG. 15 illustrates a setting screen SC6 when adjacency of the base station 1A and the base station 1B is set by specifying the segment L1 connecting the base station 1A and the base station 1B from the setting screen SC5 in FIG. 14. As illustrated, the icons indicating the base station 1A and the base station 1B are changed from the "inverted hollow triangle" to the "hollow triangle." The segment L1 connecting the base station 1A and the base station 1B is changed from the broken line to the solid line. Therefore, the operator is capable of visually confirming the fact that adjacency of the base station 1A and the base station 1B is successfully set from the map image.

In the waiting state from Act 71 to Act 73, when the processor 31 detects that the save button G11 is selected (YES in Act 73), the base station database 333 is updated by data of the map table 321 (FIG. 13, Act 80) in the same manner as in the first embodiment. Subsequently, the processor 31 erases the setting screen (FIG. 13, Act 81).

In the waiting state from Act 71 to Act 73, when the processor 31 detects that the cancel button G12 is selected (YES in Act 72), the processor 31 erases the setting screen without executing the process in Act 80 (FIG. 13, Act 81). With the procedure described above, the processor 31 completes the process to be performed when the adjacency setting operation is selected.

In this manner, according to the third embodiment, only by specifying the segment connecting the base stations, adjacency setting for the pair of base stations located at both ends of the segment is achieved. Therefore, manual input of the beacon IDs for specifying the base stations is not necessary at all, an erroneous input may be prevented in advance. In addition, labor and time for the operation required for adjacency setting may be significantly reduced.

Fourth Embodiment

Figure 16:
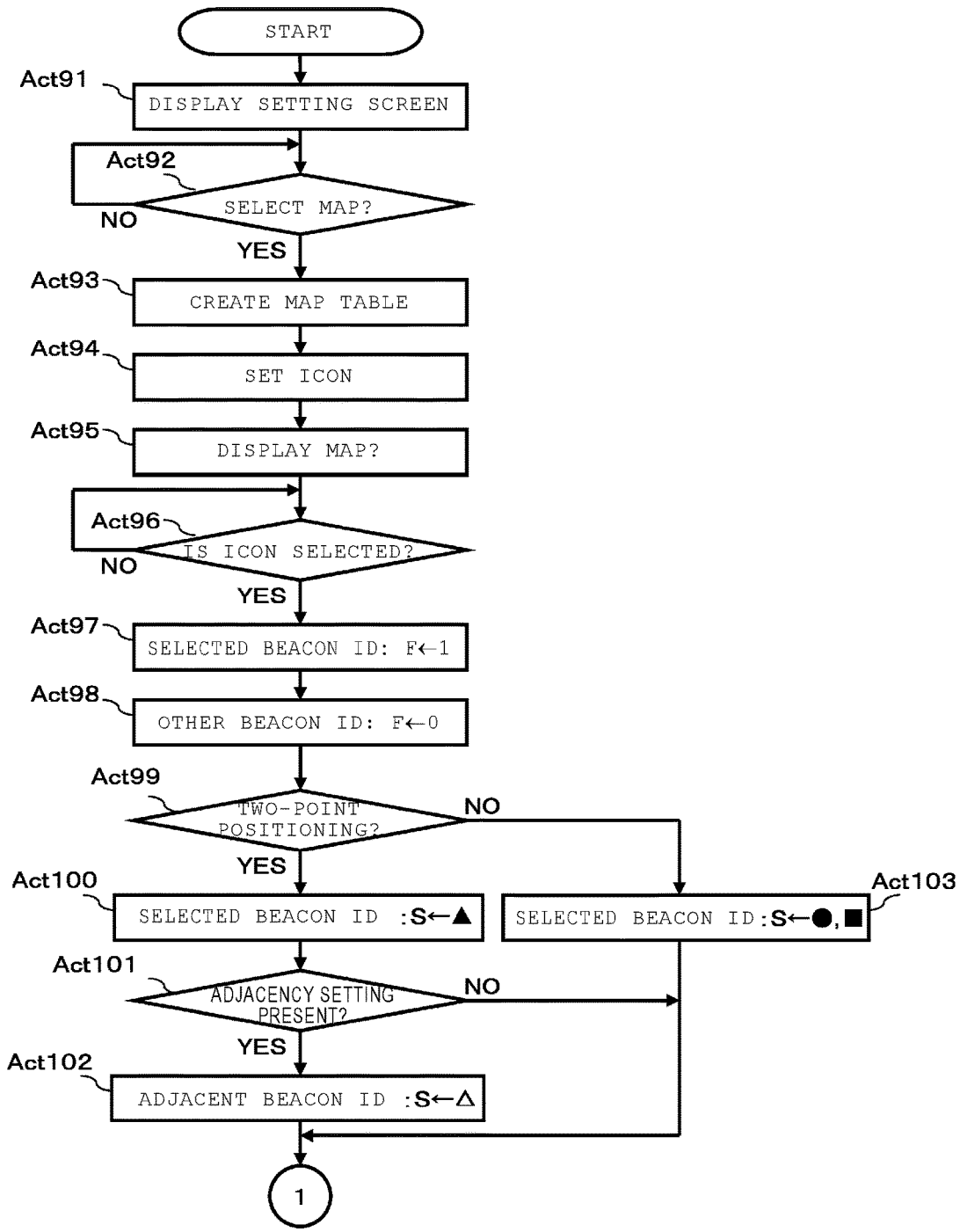
FIG. 16 is a flowchart illustrating a processing procedure to be executed by the processor of the server according to the program in a fourth embodiment.

FIG. 16 is a flowchart indicating processing procedure performed by the processor 31 when the adjacency setting is selected from operation menu of the server 3 according to a fourth embodiment. The processing procedure follow the preset program. The content of the process illustrated in FIG. 16 and described below is an example only. If the same results maybe achieved, the processing procedure and the contents are not specifically limited.

When the adjacency setting operation is started, the processor 31 first causes the display unit 36 to display a setting screen SC7 (see FIG. 17) (FIG. 16, Act 91).

Figure 17:
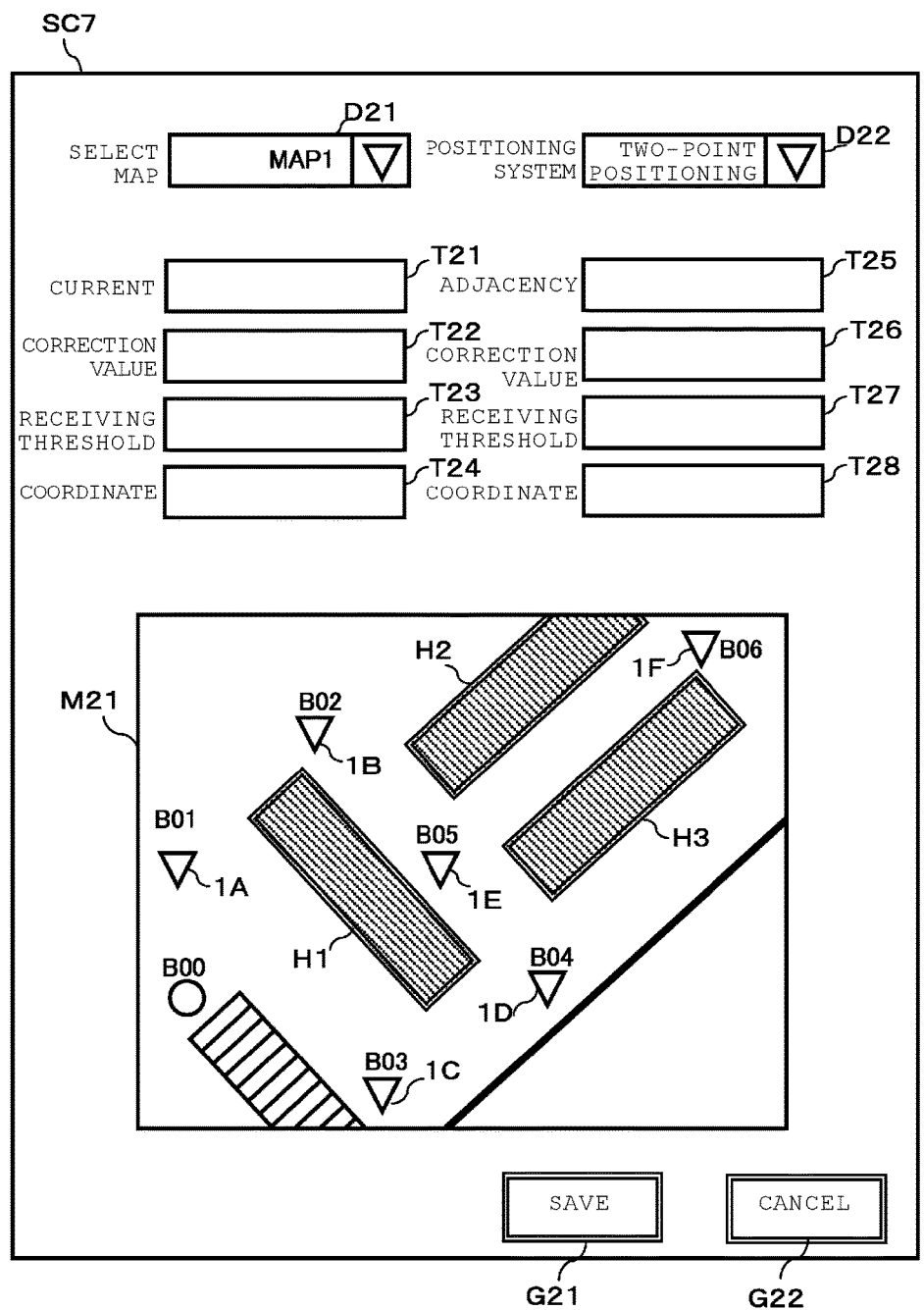
FIG. 17 is a schematic view illustrating an example of a setting screen according to the fourth embodiment.

FIG. 17 illustrates an example of the setting screen SC7. As illustrated, the setting screen SC7 includes two pull-down areas D21 and D22, eight text areas T21 to T28, one map area M21, a save button G21, and a cancel button G22.

The pull-down area D21 is an area of a pull-down list including menu items (MAP1, MAP2, . . . ) in text data indicating file names of the data file storing the map image data. The pull-down area D22 is an area of a pull-down list including menu items (one-point, two-point, and three-point) in text data relating to the positioning system.

The text area T21 is an area where the beacon ID of the corresponding base station 1 to be edited is displayed. The text areas T22 to T24 are areas where a correction value, a receiving threshold, and a setting coordinate set for the base station database 333 in association with the beacon ID of the corresponding base station 1.

The text area T25 is an area where the beacon ID of the base station 1 which is set in adjacency with respect to the corresponding base station 1. The text areas T26 to T28 are areas where a correction value, a receiving threshold, and a setting coordinate set for the base station database 333 in association with the beacon ID of the base station 1 which is set in adjacency.

The map area M21 is an area for displaying the map image based on the map image data stored in the data file having the file name selected from the pull-down list in the pull-down area D2.

A save button area G21 is a button for inputting an instruction from an operator to save information relating to association between a base station which is set in adjacency and other base stations in the base station database 333 on the setting screen SC7. A cancel button G22 is a button for inputting an instruction from an operator not to save the information in the base station database 333.

After confirmation of the setting screen SC7, the operator operates the pull-down area D21, and selects a map of a floor where adjacency setting is to be performed. The operator operates the pull-down area D22 to select a positioning system. The pull down list in the pull-down area D22 has a menu for selecting "one-point positioning", "two-point positioning", "three-point positioning", and "all", and thus the operator selects either the "two-point positioning" or "all."

The processor 31 while in a state in which the setting screen SC7 is displayed, waits for a file name of data file in which map image data is stored in the pull-down area D21 (FIG. 16, Act 92). When the file name is selected (YES in Act 92), the processor 31 creates the map table 321 in the same manner as Act 53 in the third embodiment (FIG. 16, Act 53). The processor 31 also sets an icon "hollow circle", an icon "inverted hollow triangle" or an icon "hollow square" in the item "icon S" of the map table 321 in the same manner as Act 54 in the third embodiment (FIG. 16, Act 94). The processor 31 then causes the display unit 36 to display a map image in the map area M21 from map image data and data of the map table 321 (FIG. 16, Act 95).

After confirming the map image, the operator operates the input unit 35 and selects an icon of the corresponding base station 1 to be edited among icons displayed on the map image. For example, when the input unit 35 is a touch panel, the operator touches the icon of the corresponding base station 1. For example, if the input unit 35 is a mouse, the operator places a pointer or a cursor on the icon of the corresponding base station 1 and clicks.

The processor 31 which causes the display unit 36 to display the map image waits for selection of the icon (FIG. 16, Act 96). When the icon is selected (Yes in Act 96), the processor 31 set the flag of the item "editing target F" corresponding to the beacon ID (hereinafter, referred to as selected beacon ID) of the base station 1 indicated on the map image with the selected icon to "1" in the map table 321 (FIG. 16, Act 97). The processor 31 also resets the flags of the items "editing target F" corresponding to other beacon IDs to "0" (FIG. 16, Act 98).

Subsequently, the processor 31 confirms whether the data in the item "positioning system" corresponding to the selected beacon ID is "two-point" or not in the map table 321 (FIG. 16, Act 99). In the case of the "two-point" (YES in Act 99), the processor 31 sets the icon "solid triangle" in the item "icon S" corresponding to the selected beacon ID (FIG. 16, Act 100). The processor 31 confirms whether a beacon ID is described in the item "adjacency ID" corresponding to the selected beacon ID (hereinafter referred to as the adjacency beacon ID") (FIG. 16, Act 101). When the adjacency beacon ID is set (Yes in Act 101), the processor 31 sets an icon "hollow triangle" in the item "icon S" of a data record in which the adjacency ID is stored in the item "beacon ID" of the map table 321 (FIG. 16, Act 102). When the adjacent beacon ID is not set in Act 101 (No in Act 101), the processor 31 skips the process in Act 102.

In contrast in Act 99, when data in the item "positioning system" corresponding to the selected beacon ID is not "two-point" (No in Act 99), the processor 31 sets an icon "solid circle" or an icon "solid square" in the item "icon S" corresponding to the selected beacon ID (FIG. 16, Act 103). In other words, the processor 31 sets the icon "solid circle" for a data record in which data in the item "positioning system" is "one-point", and sets an icon "solid square" for a data record in which date in the item "positioning system" is "three-point."

When the process in Act 102 or Act 103 is completed or the process in Act 102 is skipped, the processor 31 goes to the process in Act 21 in FIG. 5 described in the first embodiment.

In other words, the processor 31 then waits until either the icon is selected or the cancel button G2 or the save button G1 is selected. When an icon is selected in this waiting state (Yes in Act 21), the processor 31 executes the process in Act 24 to Act 33. When the cancel button G2 is selected (Yes in Act 22), the processor 31 erases the setting screen (FIG. 5, Act 35). When the save button G1 is selected (YES in Act 23), the base station database 333 is updated by data of the processor 31 and the map table 321 (FIG. 5, Act 34). Subsequently, the processor 31 deletes the setting screen (FIG. 5, Act 35).

Figure 18:
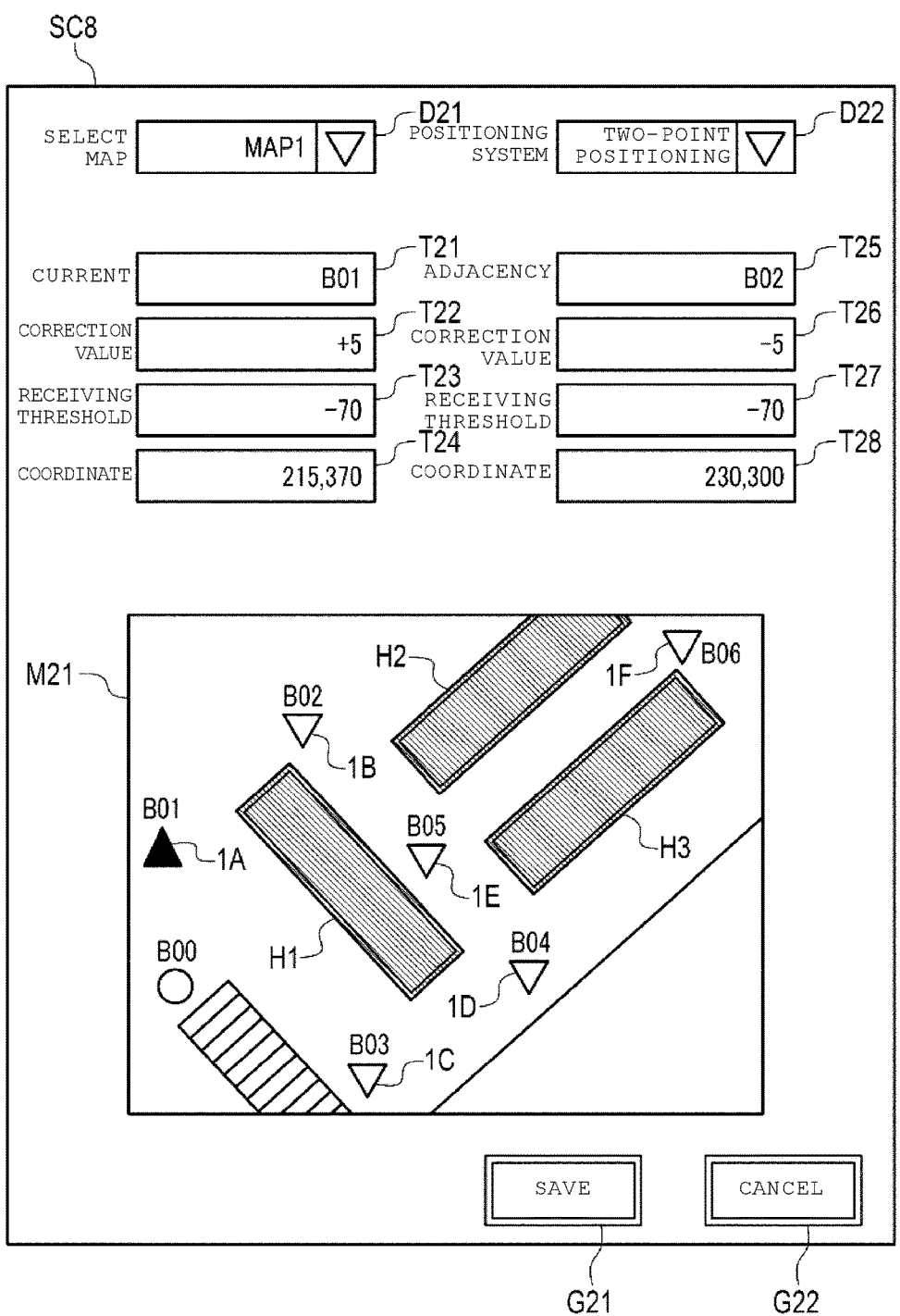
FIG. 18 is a schematic view illustrating an example of the setting screen according to the fourth embodiment.

In this manner, according to the fourth embodiment, the operator is capable of visually determining that the base stations which allow for adjacency setting with the base station 1A are base station 1B and the base station 1C from the map image displayed on the map area M21 of the setting screen SC7 illustrated in FIG. 17. Accordingly, the operator selects an icon of the base station 1A, which is the base station of interest. Then, the icon of the base station 1A is changed from the "inverted hollow triangle" to the "solid triangle" as a setting screen SC8 illustrated in FIG. 18. In the text areas T21 to T24, the beacon ID "B01", the correction value "+5", the receiving threshold "−70", the setting coordinate "215, 370" of the base station 1A are displayed. Subsequently, the operator selects the icon of the base station 1B as a base station adjacent to, for example, the base station 1A. Then, the icon of the base station 1B is changed from the "inverted hollow triangle" to the "hollow triangle" as a setting screen SC8. In the text areas T21 to T24, the beacon ID "B02", the correction value "−5", the receiving threshold "−70", the setting coordinate "230, 300" of the base station 1B are displayed. The setting screen SC8 allows the operator to visually confirm the fact that adjacency of the base station 1B with respect to the base station 1A is set. Subsequently, when the operator selects the save button G1, the base station database 333 is updated from the state illustrated in FIG. 2 to the state illustrated in FIG. 9 in the same manner as in the first embodiment. Therefore, the same advantageous effects as the first embodiment are achieved.

Modifications of the embodiments will be described below.

In the first embodiment, the beacon ID "B02" of the base station 1B may be input in the text area T2 manually instead of specifying the icon of the base station 1B. In this case as well, as illustrated in FIG. 8, the icon of the base station 1B is changed from the "inverted hollow triangle" to the "hollow triangle." Therefore, the operator is capable of visually confirming the fact that adjacency of the base station 1A indicated by the icon "solid triangle" and the base station 1B indicated by the icon "hollow triangle" is set.

In the first to fourth embodiments, the mobile station 2 transmits the RSSI value to the server 3. The mobile station 2 may convert the RSSI value to the distance information and transmits the distance information to the server 3.

In the first to the fourth embodiments, the respective base stations 1 are stations for transmitting beacon signals, and the mobile station 2 is a station for receiving the beacon signals. The mobile station 2 maybe a station for transmitting beacon signals and the respective base stations 1 may be stations for receiving the beacon signals. In this case, the server 3 acquires RSSI value or distance information converted from the RSSI from the respective base stations 1. The server 3 specifies the position of the mobile station 2 based on the RSSI value or the distance information.

In the first to fourth embodiments, the server 3 is a positioning device. The positioning device is not limited to the server 3. For example, the mobile station 2 may have a function as the positioning device.

In the first to fourth embodiments, the two-point positioning system is exemplified as the multiple-point positioning system. For example, the exemplary embodiments of the present disclosure may be applied to the three-point positioning system by associating three base stations belonging to the same set with information indicating that these base stations are one of the set for the three-point positioning system by inputting images respectively.

In the first to fourth embodiments, the information indicating that the base station is one of the set for adjacency setting is added, deleted, or modified for the data records of each of the base stations 1 stored in the base station database 333 by operating the setting screen. Updating of the data record as described above may be achieved by a method other than the operation input on the screen displayed on the display unit 36. For example, a case having a function for extracting information on the respective items set in the data record as setting file describing information line by line, which corresponds to a so-called exporting function, and a function to read the set file, which corresponds to a so-called import function are such examples. In other words, information relating to the adjacency setting is added, deleted, or modified by directly editing the set file extracted by the exporting function, and the extracted set file is reflected on the system by the importing function. Even when the data record of the base station database 333 is updated in this method, the state of the adjacency setting may be confirmed visually by displaying the map image in which the updated contents are reflected on the map area M1 of the setting screen.

When the data record of the base station database 333 is directly edited, it is necessary to verify whether the editing is correctly done or not. The verification includes the followings:

if adjacency is set from one to the other, whether adjacency is also set from the other to the one?

whether the positioning system of the base stations 1 which are set to be adjacent is a two-point positioning system or not.

whether the beacon ID of the base stations 1 which are set to be adjacent exists?

A configuration in which selection of items which need to be verified is allowed instead of verifying all of these items is preferable.

In this configuration, the verified result may be notified to the operator by being displayed on the screen together with the map image with the updated contents reflected thereon. The operator being notified with the results of verification is capable of confirming the type of the error. In such a case, whether correction of the erroneous point is desired or not may be inquired to the operator in association with the notification. For example, when "B03" is set in the data record of the beacon ID "B01" as the other beacon ID for adjacency setting, while "B01" is not set in the data record of the beacon ID "B03" as the other beacon ID for adjacency setting, the icons of the beacon ID "B01" and the beacon ID "B03" are displayed on the screen as objects to be edited. Alternatively, a screen that notifies the operator the fact that the set for adjacency setting is not correctly specified and prompts the operator whether correction is desired or not is displayed. Selection of notification to the operator and setting of whether issuing a prompt for correction or correcting without issuing the prompt may be modified as needed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein maybe made without departing from the spirit of the inventions. The accompanying claims and their equivalents are intended to cover such forms or modifications as would fall within the scope and spirit of the inventions.

What is claimed is:

1. A positioning server for a positioning system with a plurality of base stations, the server comprising:
    a communication circuit through which the positioning server receives positioning data;
    a display device;
    an input unit; and
    a controller configured to generate a user interface for display by the display device, the user interface including a user interface element through which a positioning mode of one or more of the base stations can be defined and including an image of a map of an area in which a mobile device is to be located and of icons representing the base stations that are within the area, store the positioning mode of the one or more base stations in response to inputs made through the input unit, and determine a location of the mobile device based on the positioning data and the stored positioning mode of the one or more base stations, wherein
    a positioning system is selected from among one-point, two-point, and three-point positioning systems using the user interface element and the positioning mode of the one or more base stations is defined in accordance with the selected positioning system,
    the one-point positioning system specifying the location of the mobile device based on one piece of distance information,
    the two-point positioning system specifying the location of the mobile device based on two pieces of distance information, and
    the three-point positioning system specifying the location of the mobile device based on three pieces of distance information.

2. The positioning server according to claim 1, wherein the positioning data includes radio signal strength indicator values received from the mobile device.

3. The positioning server according to claim 1, wherein the positioning data includes radio signal strength indicator values received from each of the base stations.

4. The positioning server according to claim 1, wherein the user interface includes user interface elements through which base stations that are paired for a two-point positioning mode are specified.

5. The positioning server according to claim 4, wherein the icons are selectable user interface elements, and images of the icons change when the base stations that are paired are specified for the two-point positioning mode.

6. The positioning server according to claim 4, wherein the user interface includes a user interface element for specifying that obstacles are to be avoided, and the controller prevents the base stations to be specified as pairs for the two-point positioning mode based on the specified obstacles.

7. The positioning server according to claim 4, wherein the user interface includes line segments between pairs of icons, and each of the line segments is one of the user interface elements through which the base stations that are paired for the two-point positioning mode are specified.

8. The positioning server according to claim 1, wherein the user interface includes a user interface element for specifying a distance and the controller changes the user
    interface to display an arc on the map that indicates an area on the map that is within the specified distance.

9. The positioning server according to claim 1, wherein the user interface includes a user interface element for selecting the map among a plurality of maps.

10. The positioning server according to claim 1, wherein images of the icons differ depending on a positioning mode specified for a corresponding base station.

11. A method of positioning a mobile device in a positioning system with a plurality of base stations, the server comprising:
    storing position data indicating radio signal strength between the mobile device and each of the base stations;
    generating a user interface, the user interface including a user interface element through which a positioning mode of one or more of the base stations can be defined and including an image of a map of an area in which the mobile device is to be located and of icons representing the base stations that are within the area;
    storing the positioning mode of the one or more base stations in response to inputs made through an input unit; and
    determining a location of the mobile device based on the positioning data and the stored positioning mode of the one or more base stations, wherein
    a positioning system is selected from among one-point, two-point, and three-point positioning systems using the user interface element and the positioning mode of the one or more base stations is defined in accordance with the selected positioning system,
    the one-point positioning system specifying the location of the mobile device based on one piece of distance information, the two-point positioning system specifying the location of the mobile device based on two pieces of distance information, and the three-point positioning system specifying the location of the mobile device based on three pieces of distance information.

12. The method according to claim 11, wherein the positioning data is received from the mobile device.

13. The method according to claim 11, wherein the positioning data is received from each of the base stations.

14. The method according to claim 11, wherein the user interface includes user interface elements through which base stations that are paired for a two-point positioning mode are specified.

15. The method according to claim 14, wherein the icons are selectable user interface elements, and images of the icons change when the base stations that are paired are specified for the two-point positioning mode.

16. The method according to claim 14, wherein the user interface includes a user interface element for specifying that obstacles are to be avoided, and the controller prevents the base stations to be specified as pairs for the two-point positioning mode based on the specified obstacles.

17. The method according to claim 14, wherein the user interface includes line segments between pairs of icons, and each of the line segments is one of the user interface elements through which the base stations that are paired for the two-point positioning mode are specified.

18. The method according to claim 11, wherein the user interface includes a user interface element for specifying a distance and the controller changes the user interface to display an arc on the map that indicates an area on the map that is within the specified distance.

19. The method according to claim 11, wherein the user interface includes a user interface element for selecting the map among a plurality of maps.

20. The method according to claim 11, wherein images of the icons differ depending on a positioning mode specified for a corresponding base station.

* * * * *